United States Patent  
Kudo

(10) Patent No.: US 7,505,976 B2
(45) Date of Patent: Mar. 17, 2009

(54) ACCESS CONTROLLER USING TREE-STRUCTURED DATA

(75) Inventor: Michiharu Kudo, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/168,911

(22) Filed: Jun. 28, 2005

(65) Prior Publication Data

US 2005/0289150 A1 Dec. 29, 2005

(30) Foreign Application Priority Data

Jun. 29, 2004 (JP) ............................ 2004-191425

(51) Int. Cl.
 G06F 17/30 (2006.01)
(52) U.S. Cl. .................. 707/10; 707/2; 707/9; 715/234
(58) Field of Classification Search .................. None
 See application file for complete search history.

(56) References Cited

U.S. PATENT DOCUMENTS 6,366,913 B1 * 4/2002 Fitler et al. .................... 707/9

| 2002/0016840 | A1* | 2/2002 | Herzog et al. | 709/225 |
| 2002/0078094 | A1* | 6/2002 | Krishnaprasad et al. | 707/513 |
| 2002/0111934 | A1* | 8/2002 | Narayan | 707/1 |
| 2003/0023587 | A1* | 1/2003 | Dennis et al. | 707/3 |
| 2003/0028495 | A1* | 2/2003 | Pallante | 705/78 |
| 2005/0004924 | A1* | 1/2005 | Baldwin | 707/100 |
| 2005/0240550 | A1* | 10/2005 | Armes et al. | 707/1 |

OTHER PUBLICATIONS

Japanese Publication No. 2001-273285 published on Oct. 5, 2001.
Qi et al. "A Path-table-based Access Control Model for XML Database System," IBM Research, Tokyo Research Laboratory.

* cited by examiner

Primary Examiner—Hosain T Alam
Assistant Examiner—Jieying Tang
(74) Attorney, Agent, or Firm—Vazken Alexanian

(57) ABSTRACT

Provide access control devices methods and systems that include a data structure which makes the data amount of a database constituting policies as small as possible even if a policy including a number of complicated conditions is set. An access control device of the present invention receives inputs of policies each for controlling access to a part of a data source, and stores these policies. The access control device generates tree-structured data from the stored policies, merges these tree-structured data, and stores the merged tree-structured data. When determining whether or not access should be permitted, the access control device performs determination on the basis of this stored tree-structured data.

1 Claim, 16 Drawing Sheets

DENIED : [ @ salary>10000 and @ band = 6 ]

PERMITTED : [ @ salary>10000 and @ band = 7 ]

ACCESS CONTROLLER USING TREE-STRUCTURED DATA

FIELD OF THE INVENTION

The present invention relates to an access controller using tree-structured data. More specifically, the present invention relates to performing control when a user accesses data stored in a database server.

BACKGROUND OF THE INVENTION

In order to acquire data to be processed, it has heretofore been conducted to access a database server which stores the data. In this access, the user uses a computer terminal, which is a client, to acquire the data by accessing the database server via a Local Area Network (LAN) and/or the Internet. The data stored is described in extensible Markup Language (XML) or Hyper Text Markup Language (HTML). Particularly, a document described in XML is referred to as an XML document. The XML document is known as a structured document which can be structured according to the intention of an information provider. Such XML documents are widely used from a large scale database such as a genome information database to a small scale database such as medical records.

Here, there is a case where an administrator of the database performs settings on the XML documents in which, when a user accesses the database, the access is denied depending on the user. For example, an administrator of a medical records database in a hospital needs to perform control so that a patient cannot access the medical records data of his/her own.

Specifically, for example, a method is known in which access control is performed by the use of a rule referred to as a policy. For example, the policy is determined on the basis of names, job titles, sections and the like of users.

Then, by the use of the policy, access control is performed for each file or each folder as the Windows (registered trademark) file system adopts. With this, it can be prevented that a user or a group of users with no permission access the relevant file or folder.

However, there is a case where the control is demanded in which, for a user, the access to a part of a file is permitted, and the access to the remaining part of the file is denied.

For example, assume that medical records are created as one XML document and stored in a database. In this case, it is preferred that doctors can access the whole medical records information, but interns can access only the diagnostic information of patients. However, with the access control method described above, the policy can only be set for each file. Accordingly, it is impossible to perform access control with respect to a part of the XML document.

As a method for solving such a problem, a control device enabling access with respect to each internal structural unit of an XML document is known (Japanese Patent Laid-Open No. 2001-273285, hereinafter referred to as Patent Document 1). In Patent Document 1, an access control device which control access with respect to each internal structural unit of a document by incorporating policies into an XML document is shown. The XML document of Patent Document 1 includes records which are data of a database, and policies each of which is set for each of the records. When a user accesses a part of the XML document, the access control device controls the access by reading the incorporated policies.

However, this access control device is not suitable when the number of records of the database is large. This is because when the number of records of a database increases, the number of policies to control the access to the records also increases, and thus the XML document becomes very large.

For example, as for genome information, in some cases, the data size of records of an XML document becomes one gigabyte or more. In addition, a large number of users of enterprises, academic societies and the like access the XML document. Accordingly, it is necessary to set the policy for each of the large number of users who access the XML document, and the data amount of the policies becomes enormous. Therefore, both of the data amount of the records and the data amount of the policies become enormous, and the file of the XML document becomes very large.

Under the circumstances, a method of separating policies from an XML document and making the policies into a database is known (Naishin Seki, Michiharu Kudo, "Access Control Using Pathtables for XML Database", Computer Security Group, Information Processing Society, Nov. 14, 2003; hereinafter referred to as Non-Patent Document 1). In Non-Patent Document 1, there is disclosed a method of constructing the policies as a table database. The table database is composed of path expressions for designating specific parts of an XML document, and conditions respectively corresponding to the path expressions. The condition is one which is used to determine whether or not the access from a user to the part designated by a path expression should be permitted. When a user performs access, the access control device calculates a path expression for this access request. Then, the access control device reads out a condition corresponding to the path expression from a table. If the user meets the read-out condition, the access control device permits the access to the part of the XML document which is designated by the path expression.

Incidentally, there is a case where a policy is composed of a large number of complicated conditions. The complicated condition means, in addition to a condition formed by combining AND conditions or OR conditions, a below-described condition which is used to perform a determination by the use of a data value read out from a database.

A policy including a condition which is used to perform a determination by the use of a data value is used for medical records, for example. Specifically, provided that such a policy that the access from a patient himself/herself is denied if the "malignancy degree" of a disease of the patient is 40% or more is set in an access control device, for example, when the patient himself/herself accesses the data of the medical records, the access control device retrieves the data value in which the "malignancy degree" data of the patient is recorded, and reads out the data value to determine the "malignancy degree" of the patient himself/herself. By the use of the read-out data value, it is determined whether the malignancy degree is 40% or more or is less than 40%. The access is denied when the malignancy degree is 40% or more, and the access is permitted when the malignancy degree is less than 40%.

In the above described table database, it is necessary to store the whole table into a storing device such as a memory of the access control device. However, in the table database, since a large number of data values are read from the data source file of the data values for the policy which includes a condition using a data value, the data amount of the table increases.

In this way, in the table database, when a policy which includes a condition using a data value is set for the database, it is difficult to use the hardware resources efficiently. Accordingly, the data structure in which the data amount of the database constituting a policy becomes minimum even when the policy including such a large number of complicated conditions is set, has long been awaited.

SUMMARY OF THE INVENTION

Therefore, the present invention provides methods, systems and apparatus for controlling access to a data source, An example device comprises: policy storing means for storing a plurality of policies, each for controlling access to a part of the data source, when these policies are inputted; access-determination-tree generating means for generating a plurality of tree-structured data from the plurality of policies; access-determination-tree merging means for merging the plurality of tree-structured data; access-determination-tree storing means for storing the merged tree-structured data; and access determining means for, when access to a part of the data source is attempted, determining from the merged tree-structured data whether or not the access to the part should be permitted.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
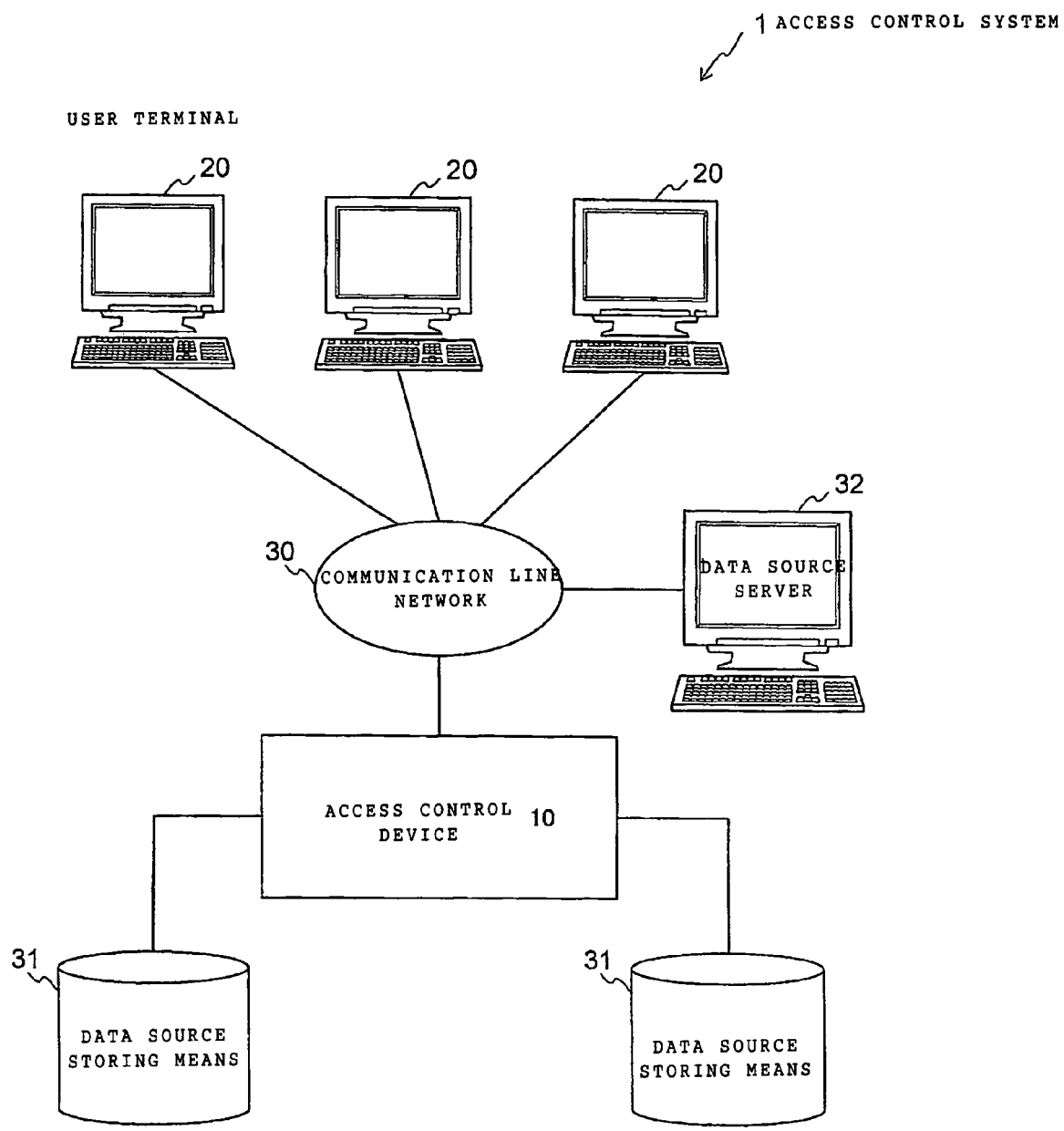
FIG. 1 shows a hardware configuration of an access control system of the present invention.

The present invention provides methods, systems and apparatus for controlling access to a data source, An example device comprises: policy storing means for storing a plurality of policies, each for controlling access to a part of the data source, when these policies are inputted; access-determination-tree generating means for generating a plurality of tree-structured data from the plurality of policies; access-determination-tree merging means for merging the plurality of tree-structured data; access-determination-tree storing means for storing the merged tree-structured data; and access determining means for, when access to a part of the data source is attempted, determining from the merged tree-structured data whether or not the access to the part should be permitted.

According to the present invention, the access control device stores a plurality of policies, each for controlling access to a part of the data source, when these policies are inputted, and generates a plurality of tree-structured data from these stored policies. Then, the access control device merges the plurality of tree-structured data thus generated, and, when access to a part of the data source is attempted, determines from the merged tree-structured data whether or not the access to the part should be permitted.

Here, for a policy composed of a plurality of conditions, a tree-structured data is constructed of nodes corresponding to the conditions, and links associating these nodes. Specifically, for all inputted policies, access-determination-tree generating means extracts conditions which are common to the policies or some of the policies, makes these common conditions upper-level nodes, and makes conditions which are not common lower-level nodes. The access-determination-tree generating means merges the common upper-level nodes. Thus, the tree-structured data is made in which the conditions represented by the upper-level nodes are shared and only the conditions represented by the lower-level nodes are different. By arranging conditions common to a plurality of policies or some of the policies at upper-level nodes, it is possible to reduce the data amount in a database for the policies and thus to efficiently use hardware resources.

For a policy composed of a plurality of conditions, a tree-structured data according to the present invention includes nodes corresponding to the conditions, and links associating these nodes. Specifically, for all inputted policies, access-determination-tree generating means extracts conditions which are common to the policies or some of the policies, makes these common conditions upper-level nodes, and makes conditions which are not common lower-level nodes. The access-determination-tree generating means merges the common upper-level nodes. Thus, the tree-structured data is made in which the conditions represented by the upper-level nodes are shared and only the conditions represented by the lower-level nodes are different. By arranging conditions common to a plurality of policies or some of the policies at upper-level nodes, it is possible to reduce the data amount in a database for the policies and thus to efficiently use hardware resources.

A description will be given below of a advantageous embodiment of the present invention with reference to the drawings. As shown in FIG. 1, an access control system 1 includes a plurality of user terminals 20, an access control device 10 connected to the user terminals 20 via a communication line network 30, a data source server 32 connected to the access control device 10 also via the communication line network 30, and data source storing means 31 directly connected to the access control device 10.

Figure 2:
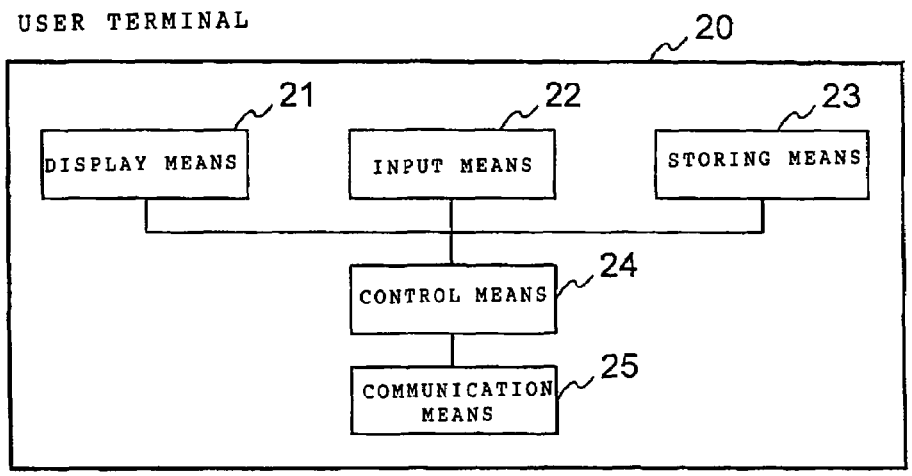
FIG. 2 shows a hardware configuration of a user terminal.

As shown in FIG. 2, the user terminal 20 includes display means 21 such as a CRT display and a liquid crystal display, input means 22 such as a keyboard, a ten-key pad and a mouse, storing means 23 such as a hard disk and a memory, control means 24 such as a CPU, and communication means 25 such as a network card connected to the communication line network 30. The user terminal 20 has a client function which enables a user to access data, which is a data source, via the communication line network 30. When a user accesses a part of the data source, the user terminal 20 transmits an access request to perform actions such as reading out, writing and updating on the part of the data source. Here, the user terminal 20 maybe either a computer terminal or a personal digital assistant.

The communication line network 30 is a network to connect the access control device 10 and the user terminals 20. The communication line network 30 may be either a Local Area Network (LAN) or the Internet.

The data source server 32 is a computer and a database server storing a data source such as an XML document the access to which is controlled. While the data source server 32 is connected to the access control device 10 via the communication line network 30, the data source server 32 may be directly connected to the access control device 10. The data source may be an XML document and the like stored as a file. The part of the data source is a partial region of the data source such as an XML document. For example, the region is one which is enclosed by tags in the XML document.

The data source storing means 31 is a device in which the data source such as an XML document is stored. For example, the data source storing means 31 may be storing means such as a hard disk. Moreover, the data source storing means 31 may be installed either outside the access control device 10 as shown in FIG. 1, or inside the access control device 10.

Figure 3:
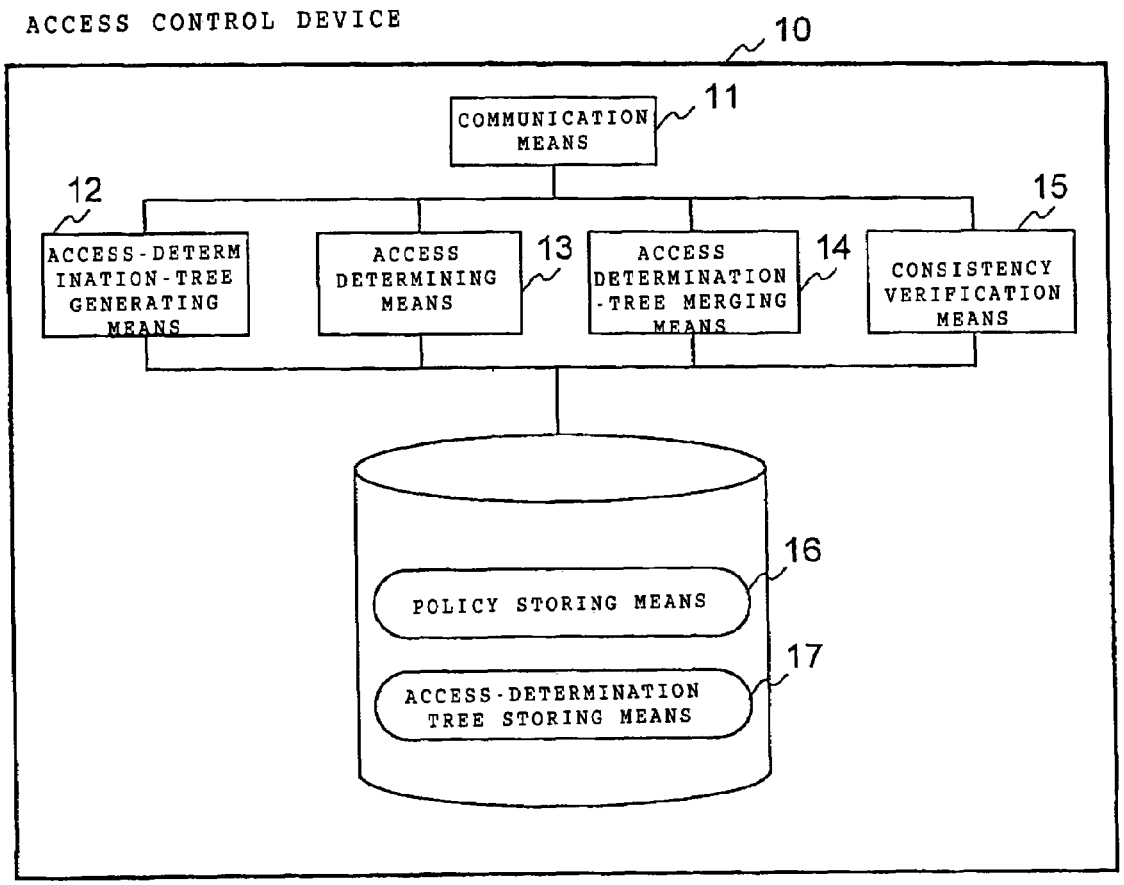
FIG. 3 shows a hardware configuration of an access control device.

As shown in FIG. 3, the access control device 10 includes communication means 11, policy storing means 16, access-determination-tree generating means 12, access-determination-tree merging means 14, access-determination-tree storing means 17, access determining means 13, and consistency verification means 15.

The communication means 11 is connected to the communication network 30 and communicates with the user terminals 20 and the data source server 32. The policy storing means 16 is a storing device which stores policies inputted from the user terminals 20 via the communication line network 30. The access-determination-tree generating means 12 generates a tree-structured data by the use of the stored policies. The tree-structured data is generated by making a condition of the policy a node, and making a value corresponding to the node a link. For the value, for example, attributes of a user (user name, group name, and path value of the part to be accessed), values read out from the data source (hereinafter referred to as "data value") are used.

The access-determination-tree generating means 12 separates a plurality of conditions and values from a policy, generates a plurality of nodes and links from the respective conditions and values separated, and connects between the nodes using links. The access-determination-tree generating means 12 similarly generates a tree-structured data for the next policy. In this case, while the access-determination-tree generating means 12 may generate a tree-structured data independently of the previously generated tree-structured data, the access-determination-tree generating means 12 may generate a tree-structured data by using an upper node of the previously generated tree-structured data to newly form a link from the node as described later using FIG. 12.

The access-determination-tree generating means 12 generates a first access determination tree and a second access determination tree. The first access determination tree is a tree-structured data which consists of conditions not including a condition (hereinafter referred to as "condition using a data value") which, by reading out a value from the data source, determines whether or not access should be permitted. For example, the first access determination tree is generated by the use of a policy which does not include a condition using a data value at all. Additionally, also in the case of the policy including a condition using a data value, the first access determination tree is generated from, among conditions included in the policy, conditions not including a condition using a data value. The second access determination tree is a tree-structured data which consists only of conditions using a data value by reading out the data value. The second access determination tree may be generated from conditions of predicate expressions described later.

The access-determination-tree merging means 14 merges the parts of the plurality of tree-structured data thus generated where the nodes and the links are common to the tree-structured data. The access-determination-tree storing means 17 stores the merged tree-structured data.

When receiving an access request from the user terminal 20, the access determining means 13 performs determination whether or not the requested access to a part of the data source should be permitted from the stored tree-structured data. The determination whether or not access should be permitted is to determine in response to the access request whether a user attempting an access can perform actions of the access request.

The access determination means 13 determines whether a condition for controlling the access to a part of the data source is a condition which needs to read out a data value from the data source or the another data source in the determination. Specifically, the access determination means 13 determines, from the access request of the user, whether or not it is an access to the part of the data source the access to which is controlled by the use of a condition which needs to read out a data value (hereinafter referred to as "access to the part which is controlled by the use of a condition using a data value"). In the case of the access to the part the access to which is controlled by the use of a condition using a data value, the access determining means 13 reads out a data value, and determines whether the access should be permitted from the read-out data value.

Figure 4:
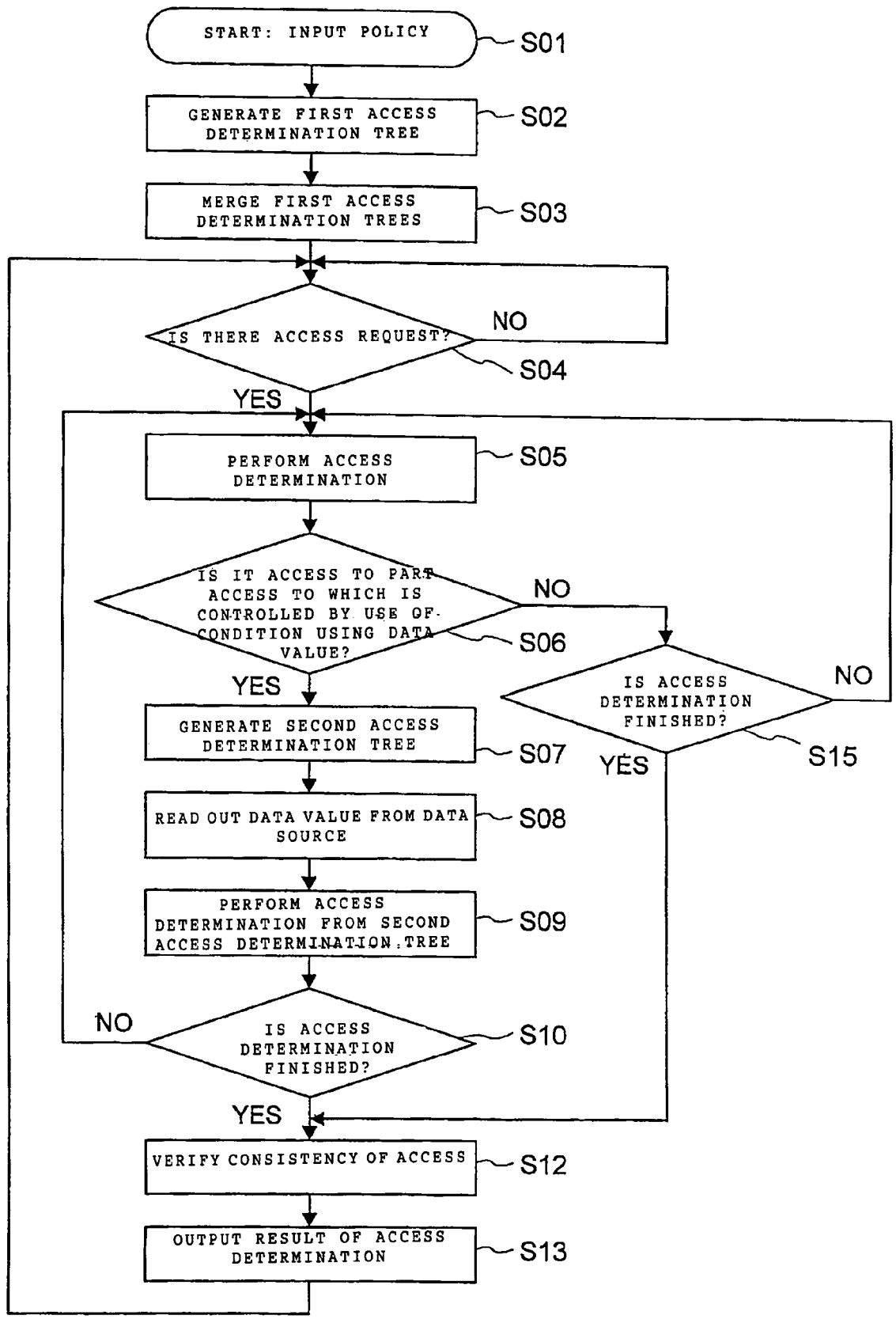
FIG. 4 is a flowchart showing an operation performed by respective means of the access control device.

A description will be given of the specific operation performed by each means of the access control device 10 with reference to the flowchart of FIG. 4. An administrator inputs policies which are to be criteria for the access determination (Step S01). The input of the administrator is performed on the user terminal 20. When the access control device 10 includes display means and input means, the policies are inputted from the access control device 10 via the input means. The inputted policies are stored in the policy storing means 16.

Next, the access-determination-tree generating means 12 generates the first access determination tree (Step S02). The first access determination tree is stored in the access-determination-tree storing means 17. Also as for the remaining inputted policies, the access-determination-tree generating means 12 generates the first access determination tree. The plurality of first access determination trees thus generated are merged by the access-determination-tree merging means 14 (Step S03).

Next, the access determining means 13 waits an access request from the user terminals 20 to the data source stored in the data source storing means 31 or the data source server 32

(Step S04). When receiving an access request, the access determining means 13 performs access determination from the first access determination tree (Step S05).

Then, during performing the access determination, the access determining means 13 determines whether the access request is a request to access the part the access to which is controlled by the use of a condition using a data value (Step S06).

When it is not the access to the part the access to which is controlled by the use of a condition using a data value, the access determining means 13 determines whether or not the access determination is finished (Step S15). When determining that the access determination is not finished, the access determining means 13 further performs determination whether or not access should be permitted from the first access determination tree (Step S05). When the access determining means 13 determines that the access determination is finished, the consistency verification means 15 verifies the consistency of the determined access (Step S12).

When the access attempted by a user is the access to the part the access to which is controlled by the use of a condition using a data value, the access-determination-tree generating means 12 generates the second access determination tree (Step S07). The second access determination tree is a tree-structured data generated from conditions using a data value. The second access determination tree is stored in the access-determination-tree storing means 17.

To determine the access with respect to the second access determination tree, it is necessary to read out a data value to be an index of the determination. The access determination means 13 reads out the data value from the data source (Step S08). The access determination means 13 performs determination from the second access determination tree by the use of the read-out data value (Step S09). The access determination means 13 performs determination whether the access determination is finished (Step S10). If the access determination is not finished, the access determination means 13 further performs access determination (back to Step S05).

If the access determination is finished, the access determination means 13 verifies the consistency of the determined access (Step S12). Then, the access determination means 13 outputs the verified determination result (Step S13). By the use of the result, the user terminal 20 performs the access to a part of the data source stored in the data source storing means 31 or the data source server 32.

A description will be given of how the access control device 10 performs determination via each means when specific policies are inputted. Specifically, a description will be given of the case where the policies below are inputted and the access control device 10 performs access determination.

Assume that a policy, "Alice can see personnel information, but cannot see confidential information; Bob cannot see either personnel information or confidential information," is inputted. To simplify this policy, the access control policy, which is described in a path expression language shown in Table 1 below, is used. For a part of the path expression language of Table 1, XML Path Language (XPath) can be used.

TABLE 1

| Name | Explanation | Example |
| --- | --- | --- |
| Subject-Type | group, user ID, function | UserID |
| Subject | identifier of accessing user | Alice |
| Object | path expression to designate a position of the accessed document | /site/people |

TABLE 1-continued

| Name | Explanation | Example |
| --- | --- | --- |
| Access-mode | +: access possible/−: access impossible R: reading out, W: writing, U: updating, D: deletion If the alphabet is uppercase, all of the following nodes can be accessed. If the alphabet is lowercase, the relevant node only can be accessed. | −R, +r |

A description will be given of the path expression language. Subject-Type determines what kind Subject is. For example, it is possible to employ UserID as Subject-Type and to employ UserName as Subject. In addition, it is possible to employ Group as Subject-Type and to employ GroupName as Subject. Incidentally, Object is an object to which the access control is performed, designating the position or the part of the data source to which a user actually performs access. Each element of the path expression specified by Object is defined as a path value. Access-mode is a content of the determination, which is effective when the conditions of Subject and Object are satisfied. The content of the determination may be, for example, a content of "access permitted" or "access denied", or a content of "access possible" or "access denied" to read out. In this embodiment, described is the determination performed when a user attempts to read the document. However, the present invention can be similarly applied to the determination whether or not the access of a user to perform writing should be permitted, the determination whether or not the access of a user to perform updating should be permitted, and the determination whether or not the access of a user to perform deletion should be permitted.

+R of Access-mode means that all of the nodes not higher in the hierarchy than the part designated by Object can be accessed. On the other hand, +r means that only the node of the relevant hierarchical level can be accessed. When +R is adopted for Access-mode, an upper node can determine all of the Access-modes of the lower nodes.

Moreover, Access-mode may not necessarily be an end result of determination. For example, in the case of a condition in which it is determined by the use of a data value of the data source whether or not access should be permitted, Access-mode may be a condition expression which should be satisfied by a data value. Such a condition expression is defined as a predicate expression. The predicate expression will be described later using FIG. 8.

An access control policy is composed of a rule or a plurality of rules. For example, one rule is expressed as follows.

<Subject-Type, Subject, Object, Access-mode> (1)

The above described policy for Alice and Bob will be described as the expression (2) below when the access control policy is used. Here, it is assumed that personnel information is located where the path, /site/people, designates in the XML document, and similarly, confidential information is located where /site/secret designates. In the expression (2), three rules are described in the access control policy.

<USERID, Alice, /site/people, +R>

<USERID, Alice, /site/secret, −R>

<USERID, Bob, /site, −R> (2)

Figure 5:
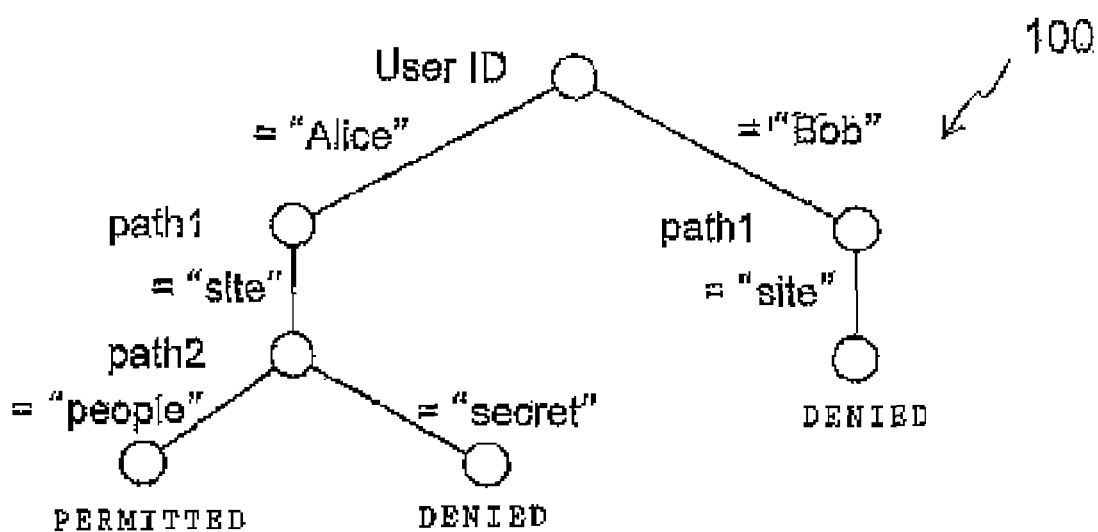
FIG. 5 shows an example of performing access determination by the use of an access determination tree.

An access determination tree 100 of FIG. 5 is generated by the use of this access control policy. As shown in FIG. 5, the access determination tree 100 is constructed of nodes and one or more of links under the node. The link is a path which connects between the nodes. There may be three or more of links from one node. An attribute to perform determination whether or not access should be permitted is set to each node.

The attribute is a determination index used in moving from one node to the next node. The attributes are Subject-Type and path, for example. Specifically, in the access determination tree 100, since Subject-Type is UserID, UserID is the attribute. In the next node, each path of Object is the attribute.

A link is generated from each element of the path expression corresponding to each attribute. Then, a new node is generated at the point linked to, and an attribute is assigned to the node.

When there is an access from a user, determination is performed by comparing each path expression element calculated from this access request and each attribute. A description will be given of a case, for example, where Alice attempts to access "/site/people," and the access determining means 13 performs determination by the use of the access determination tree 100. First, the access determining means 13 receives the access request, and separates elements of the path expression of the access request. In the case of FIG. 5, since the attributes are UserID, path1, and path2, the access determining means 13 determines that elements of the path expression corresponding to the attributes are "Alice," "site," and "people." By comparing these elements and attributes, the access determining means 13 performs determination and follows the links of the access determination tree 100. In the end node, since Access-mode is set as "permitted," this access will be permitted.

In addition, assume that Alice has requested access to "/site/people/emailaddress." The "/site/people/emailaddress" is a lower node of "/site/people" in the hierarchical structure. Since Alice can see all personnel information (+R) for "/site/people," Alice will be permitted to see information for "/site/people/emailaddress" which is a lower node thereof. In this way, by means of Access-mode of the end node of the tree-structured data, the access determination of a lower node can be determined by the upper node.

Next, a method of generating an access determination tree from the access control policy will be described in detail. Here, as an example, a description will be given of a case where the access-determination-tree generating means 12 generates an access determination tree for Subject, and then generates an access determination tree for Object. However, the order in which the access determination trees of Subject and Object are generated may be arbitrary.

Figure 6:
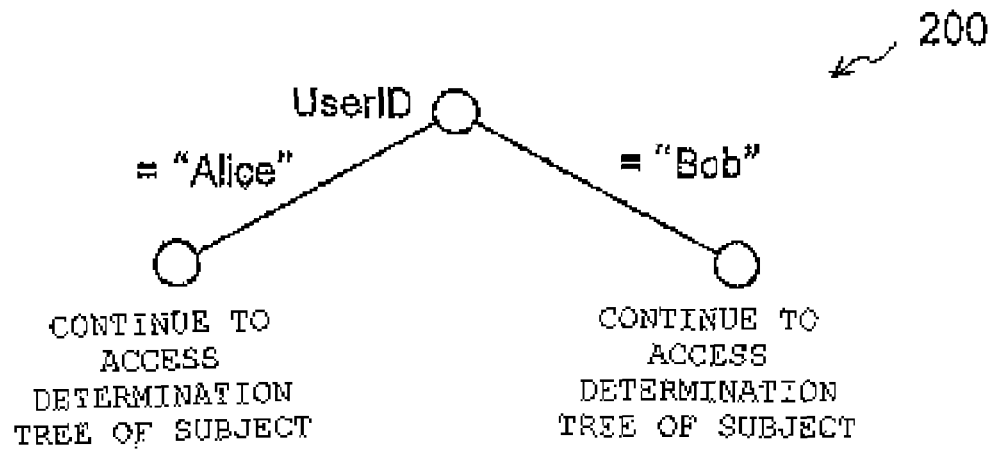
FIG. 6 shows an example of generating an access determination tree for Subject.

In FIG. 6, an access determination tree 200 for Subject-Type and Subject are shown. Here, the access-determination-tree generating means 12 generates the access determination tree of the rule shown in the expression (3). UserID selected as Subject-Type is the attribute to determine which node should be selected when a link is made from a node to the next node. For this attribute, the nodes linked to are generated by "Alice" and "Bob" as elements by which the tree structure is branched.

<USERID, Alice, . . . >

<USERID, Bob, . . . >  (3)

Figure 7:
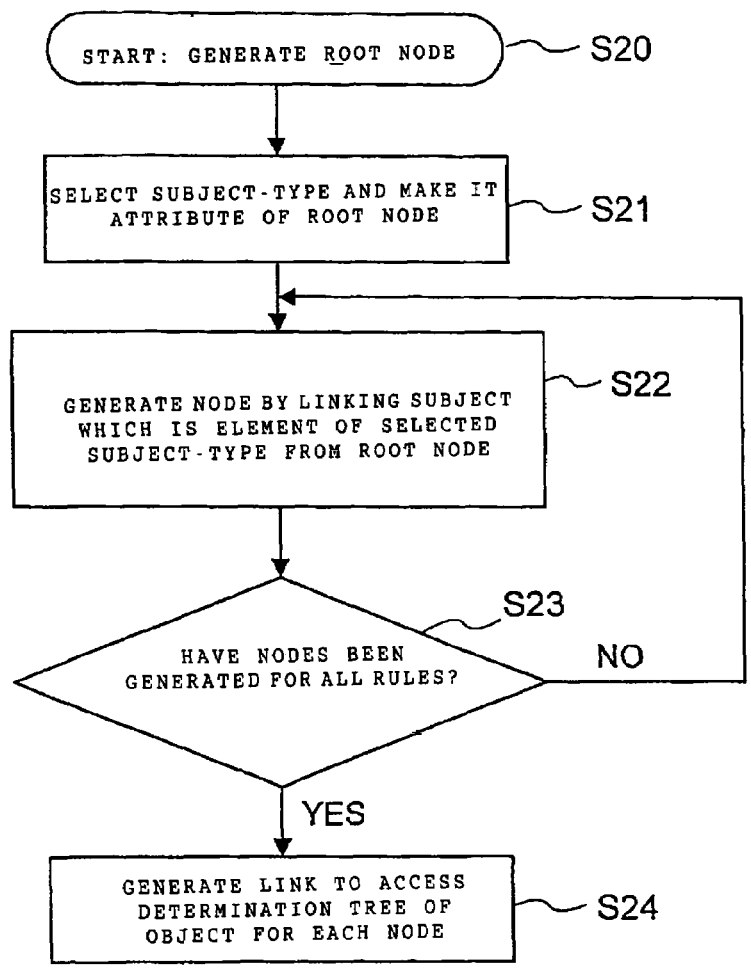
FIG. 7 is a flowchart for generating an access determination tree for Subject.

A method of generating an access determination tree for Subject is shown as a flowchart in FIG. 7. The access-determination-tree generating means 12 generates a root node to be the root of the tree structure (Step S20). The access-determination-tree generating means 12 assigns Subject-Type to this root node, selects Subject-Type from such access control policy as is shown in the expression (3), and makes it the attribute of the root node (Step S21). Moreover, the access-determination-tree generating means 12 selects one Subject (Alice, for example) from the access control policy, makes it a value for a link, and generates a new node at the point linked to (Step S22). If the access control policy is composed of a plurality of rules as shown in the expression (3), and if Subject-Type is identical (Step S23), next Subject (Bob in the case of the expression (3)) is selected, and the access-determination-tree generating means 12 generates a link and a new node. Here, the link of Bob is generated in such a manner that the link is connected from the node of UserID which is set as the root node in the rule of Alice. Moreover, the access-determination-tree generating means 12 generates a link to the access determination tree of Object for each generated node (Step S24).

Instead of generating the link of Bob by connecting in such a way, it is also possible that, for example, after a root node of UserID, a link of Bob, and a node linked to are newly generated for the rules of Bob, the access-determination-tree merging means 14 merges it with the access determination tree generated from the rules of Alice.

Figure 8:
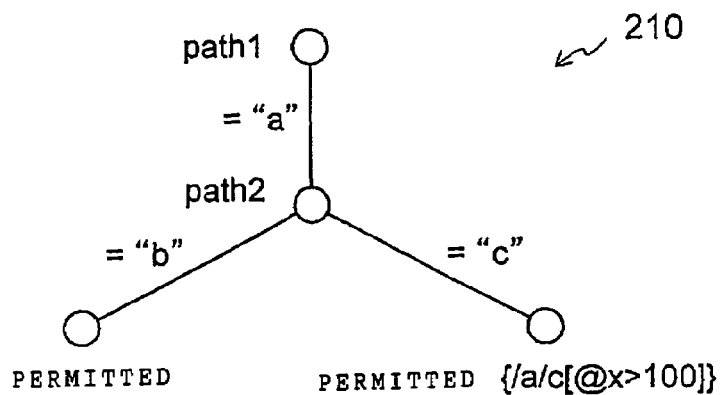
FIG. 8 shows an example of generating an access determination tree for Object.

Next, an access determination tree for Object is generated from the access control policy. FIG. 8 shows an access determination tree 210 for Object. In FIG. 8, only an Object part of the rules represented by the expressions (4) and (5) is shown. In the expression (4), the Object part is "/a/b," and in the expression (5), it is "/a/c[@x>100]." Particularly, "[@x>100]" in the Object part of the expression (5) is a predicate expression.

<USERID, Alice, /a/b, +R>  (4)

<USERID, Bob, /a/c[@x>100], +R>  (5)

A predicate expression is a determination expression used when a data value is read out from a data source and the access control is performed on the basis of the data value. When the condition of this predicate expression is satisfied, the determination content of Access-mode set to this node is employed. Specifically, the predicate expression of the expression (5) means that the access determining means 13 reads out a data value corresponding to the condition variable x from the data source, and if the data value is larger than 100, the access is permitted. The mark "@" in the predicate expression is a mark which indicates the border between the predicate expression and the element of Object. Another mark may also be used.

In addition, the predicate expression is an arithmetic expression for comparing the data value read out from an XML document and the variable in the predicate expression. Two or more conditions may be combined by the use of AND and/or OR in a predicate expression. For example, it is possible to employ a determination expression, such as "a/b/[@x>100] AND /a/b/[@c="abc"]," for example, in which the determination whether or not access should be permitted is performed by comparing data values and condition values of x and c.

Figure 9:
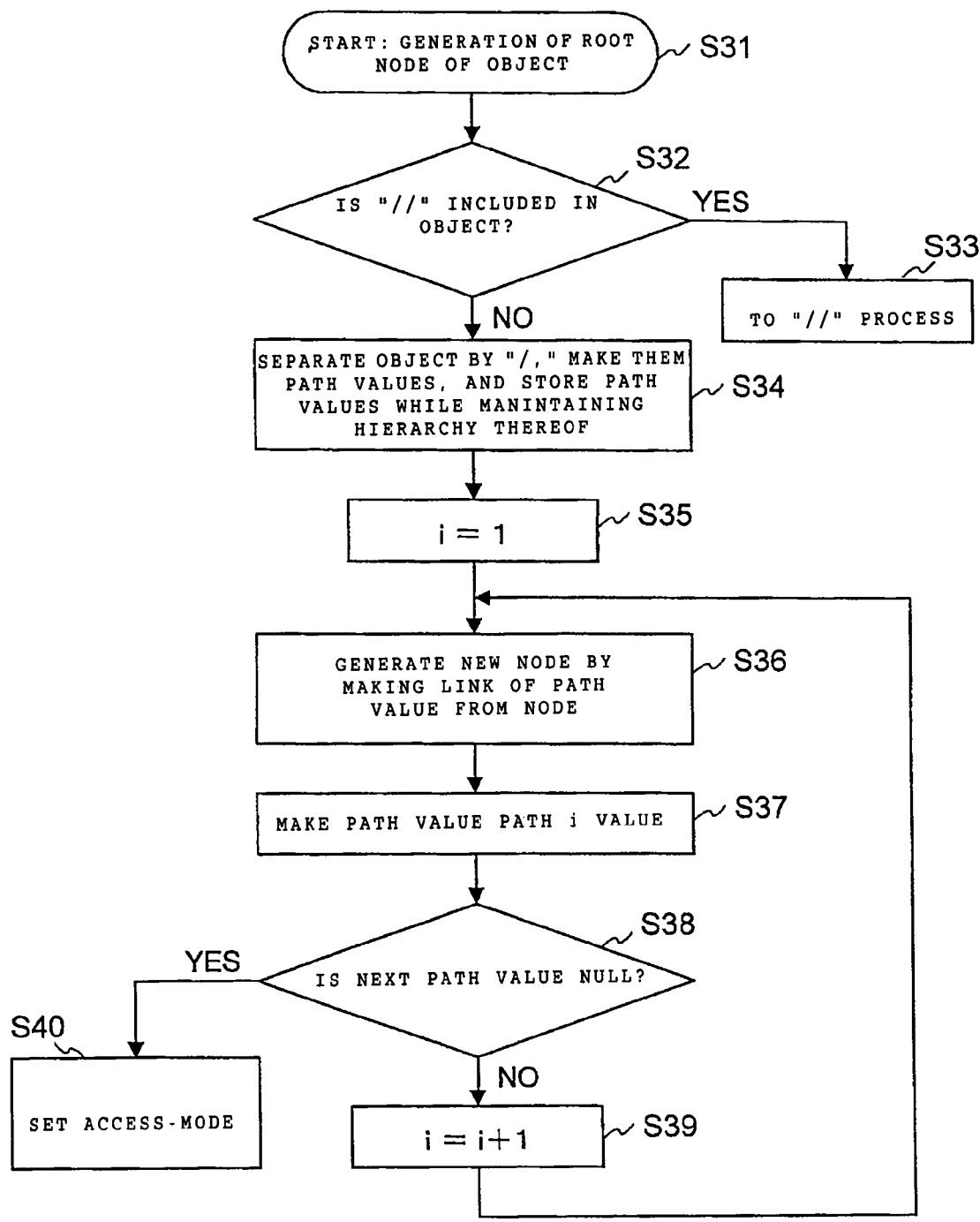
FIG. 9 is a flowchart for generating an access determination tree for Object.

In FIG. 9, a method of generating an access determination tree for Object is shown as a flowchart. The access-determination-tree generating means 12 generates a root node of Object (Step S31), and determines whether "//" is included in Object (Step S32). If "//" is included in Object, the "//" process is performed (Step S33). The "//" process will be described later using FIG. 11.

If "//" is not included in Object, the access-determination-tree generating means 12 makes each element of Object separated by "/" in Object a path value, and stores the path value while maintaining the hierarchy of the path values (Step S34).

For example, Object of "/a/b/d" is separated into the path values of a, b and d, and is stored with the hierarchy that a is the first in Object, b is next to a, and d is the next maintained.

The integer i is used to discriminate each path to be the attribute of the node. The access-determination-tree generating means 12 sets i=1 (Step S35), generates a new node by making a link of the path value from a node (Step S36), and makes the path value of the new node the value of the path1 (Step S37).

Further, the access-determination-tree generating means 12 determines whether the next path value is NULL (i.e. there is no next element) (Step S38), and, if it is not NULL, the access-determination-tree generating means 12 adds 1 to i to generate a node of the further lower hierarchical level (Step S39), and returns to Step S36. When determining that the next Object value is NULL, the access-determination-tree generating means 12 sets Access-mode for the end node which is to be the end of the nodes (Step S40). For Access-mode, the access-determination-tree generating means 12 typically sets the permission or denial of access. However, in the case of the expression (5), for Access-mode, a predicate expression to be the condition for the permission or denial of access is set as well as the permission or denial of access is set.

$$<\text{USERID, Alice}, /a/c//d, +R> \quad (6)$$

As shown in the expression (6), in some cases, "//" is included in Object. In this case, for example, no matter whatever hierarchy exists under "/a/c/," Alice can access "/d" under the hierarchy. In other words, "//" means that no matter whatever path value the third hierarchical level is, it is possible to access "/d" under the level.

Figure 10:
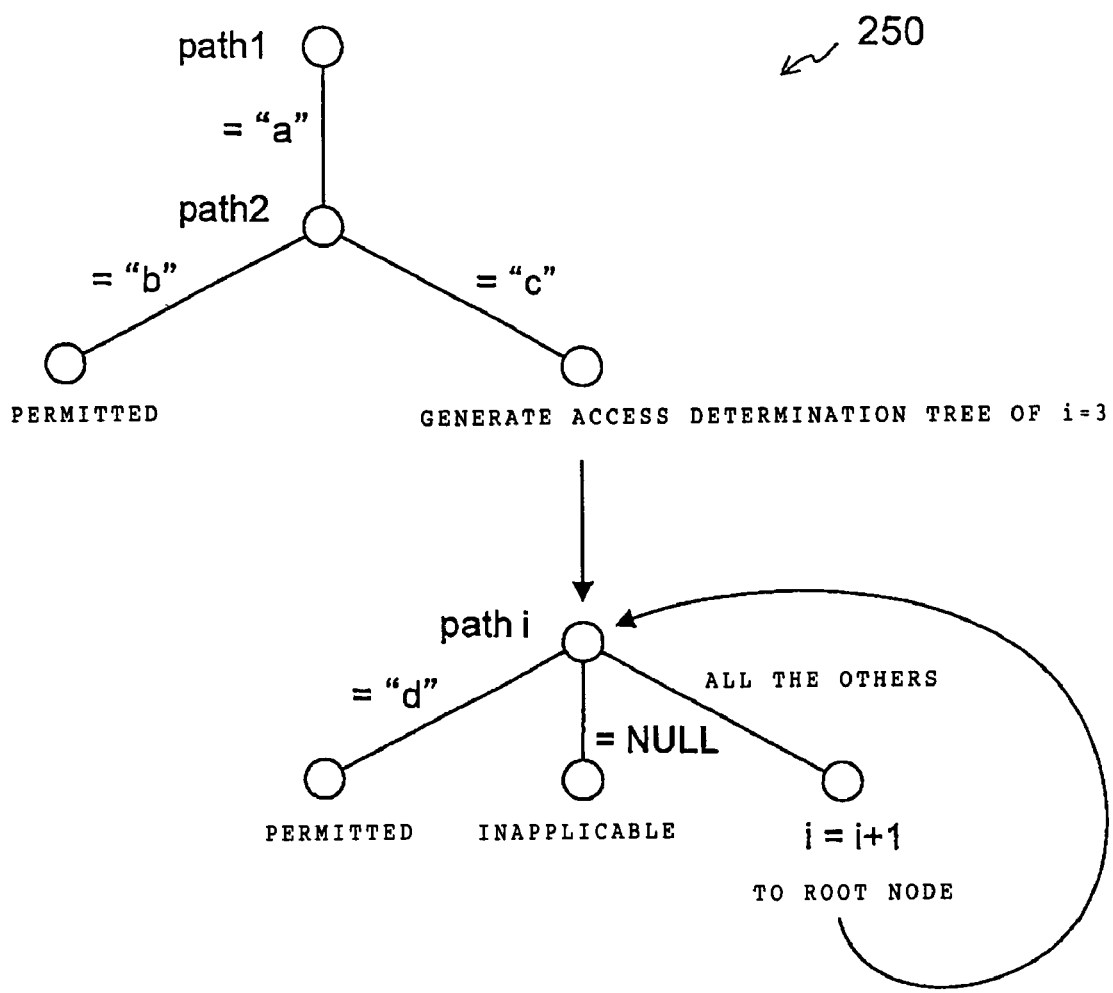
FIG. 10 shows an example of an access determination tree given when "//" is included in Object.

In FIG. 10, the expression (6) is represented as an access determination tree 250. The nodes are generated by the above described separation of the Object elements until path2="c." When "//" is reached, a new access determination tree is generated. This new access determination tree is constructed of three nodes, which are a node linked to when the value is "d," a node linked to when the value is "NULL," and a node linked to when the value is "all the others." The node which is linked to when the value is "all the others" is selected when the value does not match whichever values other than "all the others." When the value is "all the others," i is added by 1, and the "//" processing returns back to the root node of the newly generated access determination tree.

Figure 11:
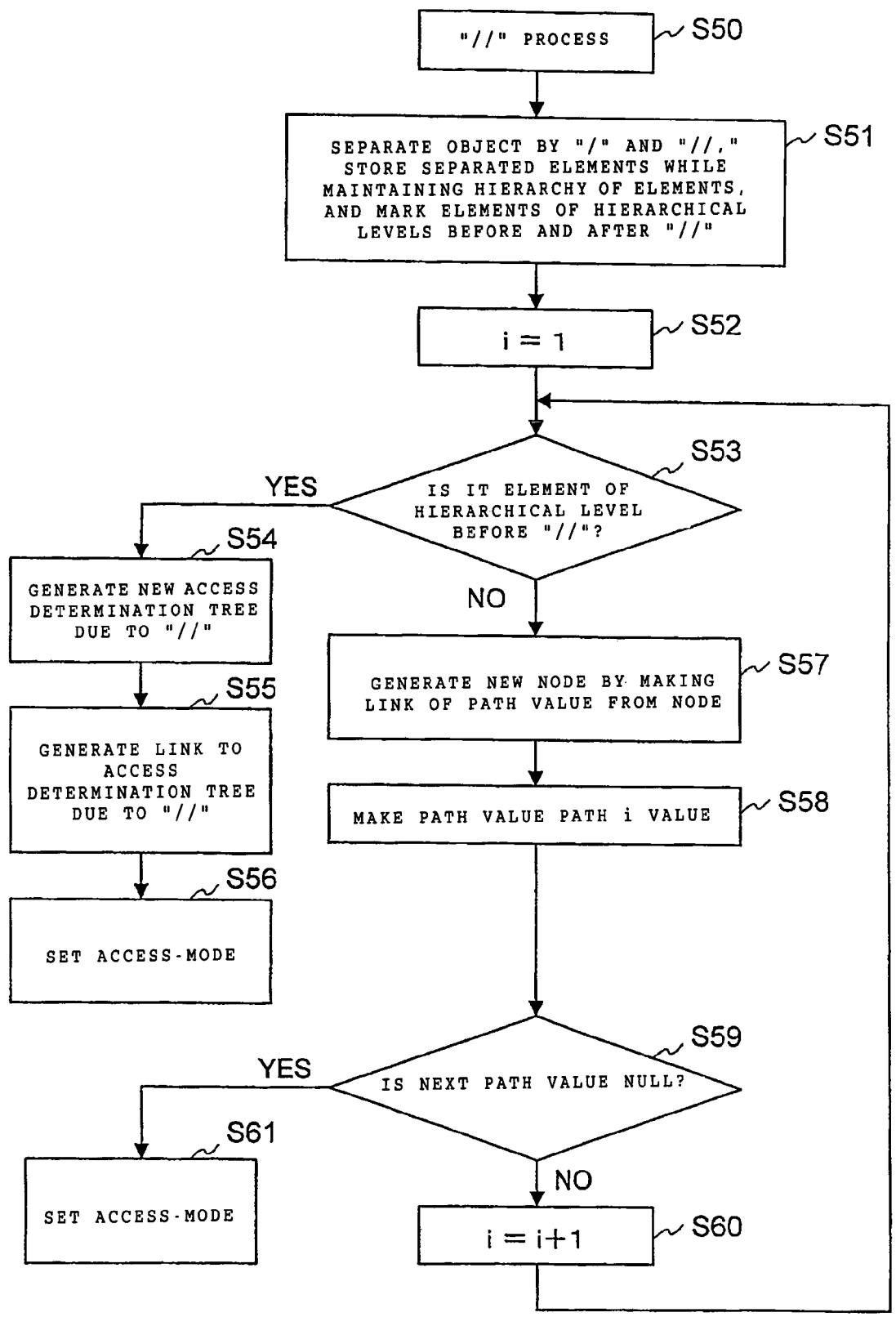
FIG. 11 is a flowchart for generating an access determination tree when "//" is included in Object.

A flowchart of the "//" process is shown in FIG. 11. The access-determination-tree generating means 12 separates Object by "/" and "//", stores them while maintaining the hierarchy of the path values separated, and marks the hierarchical levels before and after "//" to distinguish from those of "/" (Step S51). The access-determination-tree generating means 12 determines whether it is the path value of the hierarchical level before "//" from this marking (Step S53). If it is not the path value of the hierarchical level before "//," the above described generation process of the access determination tree for "/" is performed (from Step S57 to Step S61). If it is the path value of the hierarchical level before "//," a new access determination tree is generated (Step S54). The access-determination-tree generating means 12 generates a link between the new access determination tree and the parent access determination tree (Step S55), and set Access-mode (Step S56).

In the step of generating the new access generation tree, as shown in FIG. 10, generated are a node which is generated from the path value after "//" (the path value "d" in the case of FIG. 10), a node the path value of which is NULL, and a node the path value of which is "all the others". Then, access-determination-tree generating means 12 sets the determination content specified by the rule to the node which is generated from the path value after "//," and sets "inapplicable" to the NULL node. Moreover, the access-determination-tree generating means 12 sets, to the node of "all the others," processing of adding 1 to the value of i and a link to the root node of the new access determination tree.

Figure 12:
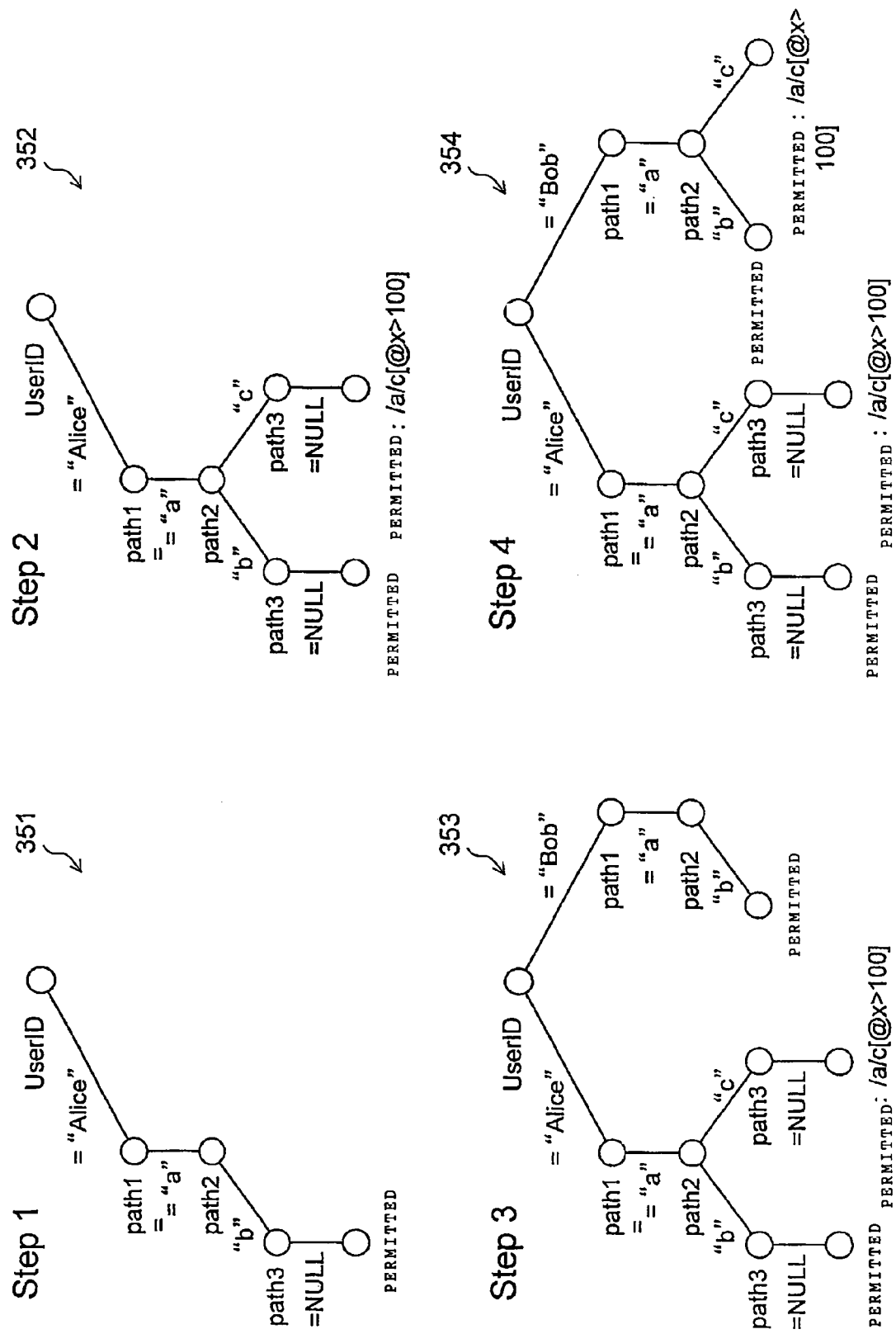
FIG. 12 shows a sequence of generating an access determination tree.

As a method of generating an access determination tree, a method may be adopted in which access determination trees for Subject and for Object are individually generated, and merged. Alternatively, a method may be adopted in which, as shown in FIG. 12, each of the rules constituting the access control policy is read one by one, and an access determination tree is generated by the use of nodes and links of the other access determination trees which have already been stored. As an example of a method of the latter case, a case will be discussed where an access determination tree is generated from the rules of the expressions (7) to (10).

$$<\text{USERID, Alice}, /a/b, +r> \quad (7)$$

$$<\text{USERID, Alice}, /a/c[@x>100], +r> \quad (8)$$

$$<\text{USERID, Bob}, /a/b, +R> \quad (9)$$

$$<\text{USERID, Bob}, /a/c[@x>100], +R> \quad (10)$$

The access-determination-tree generating means 12 generates an access determination tree 351 of Step 1 from the expression (7), connects the rule of the expression (8) to a node of the access determination tree 351 of Step 1, and generates an access determination tree 352 of Step 2. In this way, two rules (the expressions (7) and (8)) can share the determination conditions of path2 and the upper nodes thereof. When the common part is large, it is possible to efficiently generate a data structure for a complicated designation (path expression) of Object. Subsequently, an access determination tree 353 of Step 3 is generated from the expression (9), and an access determination tree 354 of Step 4 is generated from the expression (10).

The access-determination-tree generating means 12 may change the order of paths so that such a common part becomes maximum in a plurality of access determination trees. Specifically, the arrangement of the nodes may be changed so that the common part of the tree-structured data becomes maximum. When the common part is large in a plurality of tree-structured data, since the data amount of the entire tree-structured data decreases, the hardware resources of the access control device 10 can be efficiently used.

Although, in the above description, an access determination tree has already be generated and stored before the access determination is performed, the time of generation of the access determination tree may be during the execution of the access determination. Specifically, the access determination tree may be generated and stored when there is an access request from a user, and the access determination may then be performed.

Figure 13:
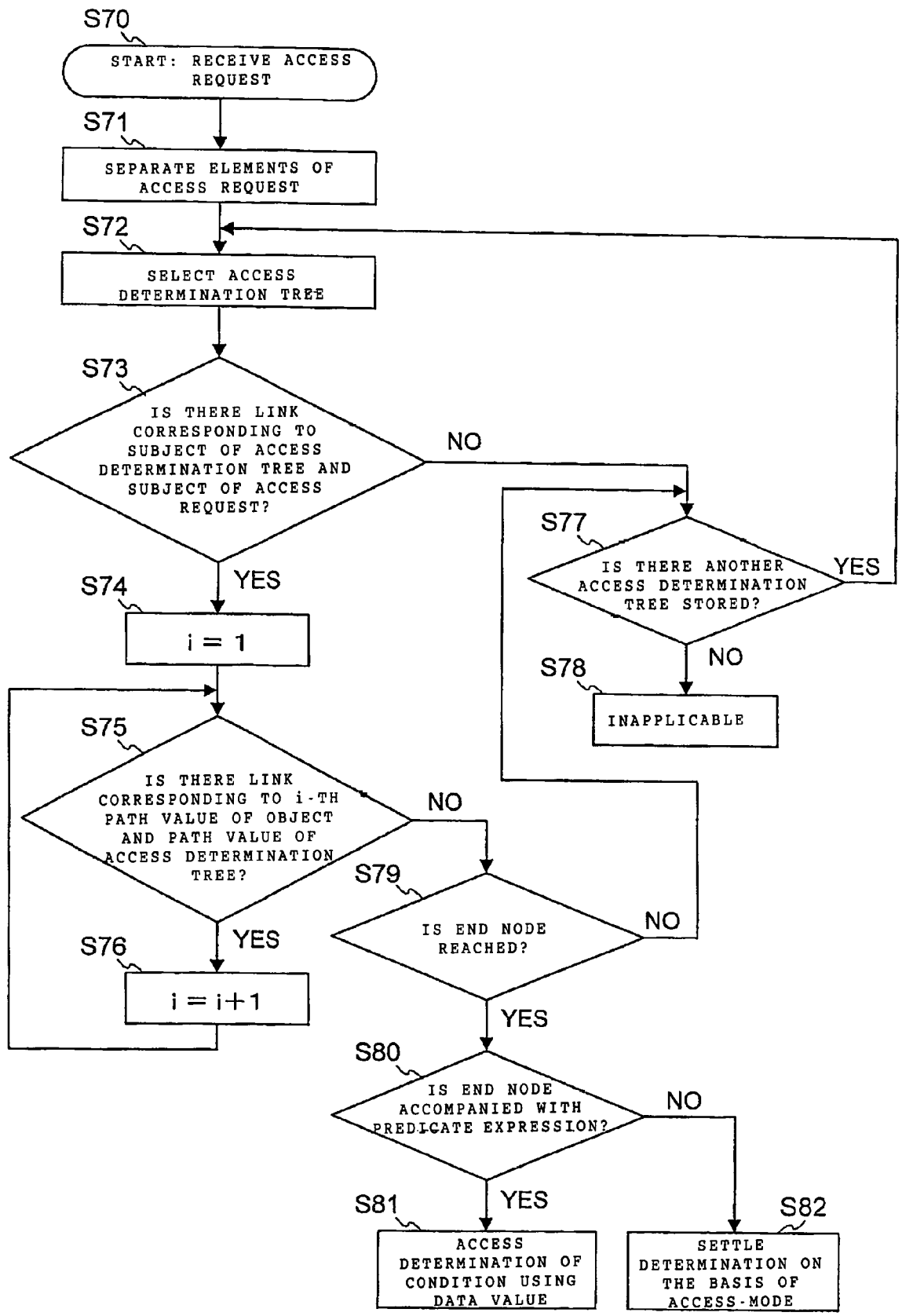
FIG. 13 is a flowchart showing a process sequence of access determination.

Next, a more detailed description will be given of the access determination performed when there is an access request from a user for the access determination tree generated by the access-determination-tree generating means 12. FIG. 13 is a flowchart of the access determination.

The access determining means 13 receives an access request, and separates the elements of the access request (hereinafter referred to as "access request elements") (Step S71). Specifically, the access determining means 13 separates the attributes of the access from the access request in terms of Subject-Type, Subject, and path values. By the use of the separated access request elements, the access determination is performed.

First, the access determining means 13 selects one access determination tree from among the access determination trees stored in the access-determination-tree storing means 17 (Step S72). Next, the access determining means 13 compares the Subject-Type value of the selected access determination tree and the Subject-Type value of the access request elements. When both of the Subject-Type values agree with each other, the access determining means 13 determines whether there exists the link which corresponds to the Subject value of the access determination tree and the Subject value of the access request (Step S73).

When there is no corresponding link, the access determining means 13 determines that it is impossible to perform the access determination by the use of this access determination tree. In this case, the access determining means 13 determines whether an access determination tree other than this access determination tree (hereinafter referred to as another access determination tree) is stored in the access-determination-tree storing means 17 (Step S77) If another access determination tree is stored, the access determining means 13 performs the process from Step S72 for the another access determination tree.

On the other hand, if another access determination tree is not stored, it is determined to be "inapplicable" (Step S78). The case of "inapplicable" means the case where there exists no policy for this Subject from the beginning, or the case where there is arising the necessity of generating a new access determination tree relating to this policy. Accordingly, in the former case, the administrator may set Access-mode to permit access. In the latter case, the process of generating an access determination tree may as well be performed.

In the case where there exists a relevant link, the access determining means 13 compares the Object value of the access request elements and the path value of the access determination tree, and follows the link of the access determination tree (Step S75). When there exists a link, the access determining means 13 adds 1 to i, and further follows the link to a deeper hierarchical level (Step S76). When there is no link, the access determining means 13 performs the determination of Step S79.

Next, the access determining means 13 determines whether the node of the access determination tree for which comparison is being performed is an end node (Step S79). If it is an end node, the access determining means 13 performs the determination of Step S80. If it is not an end node, the access determining means 13 determines that it is impossible to perform the access determination by the use of this access determination tree. In this case, the access determining means 13 determines whether another access determination tree is stored in the access-determination-tree storing means 17 (Step S77). If another access determination tree is stored, the access determining means 13 performs the process from Step S72 for the another access determination tree. If another access determination tree is not stored, the access determining means 13 determines that it is "inapplicable" (Step S78).

When determining that it is an end node of the access determination tree, the access determining means 13 determines whether the node is accompanied with a predicate expression to be a condition of the access determination (Step S80).

When the node is not accompanied with a predicate expression, the access determining means 13 settles the determination on the basis of the content of the determination which is set to Access-mode (Step S82). Here, the settlement of the determination may be an interim settlement, and the consistency verification means 15 may perform the consistency verification of the access for the settlement.

When the node is accompanied with a predicate expression, the access determining means 13 determines the predicate expression, and performs the access determination of a condition using a data value, as well as settles the determination (Step S81).

Here, in some cases, there exist a plurality of access determination trees in each of which the links can be followed to the end node. Specifically, this is the case where a plurality of access determination trees are stored in the access-determination-tree storing means 17 as different access determination trees while the attributes of the respective nodes of the access determination trees are identical. In this case, while there exists a case where a plurality of settlements of the determination exist, the consistency verification means 15 may verify which result is appropriate among the plurality of the results.

A description will be given of the determination which is performed by the access determining means 13 when an access request, "A user, Alice, wants to read /site/people/person/emailaddress," is made, for example. The access determining means 13 decomposes the access request into Subject-Type, Subject, and Object, and makes them access request elements. The access request elements are shown in the expression (11).

Subject-Type: UserID

Subject: Alice

Path1: site

Path2: people

Path3: person

Path4: emailaddress (11)

The access determining means 13 selects an access determination tree from among the access determination trees stored in the access-determination-tree storing means 17, and determines whether Subject-Type shows an agreement in UserID and there exists a link Subject of which is Alice. Specifically, when the access determination tree 100 of FIG. 5 is selected as an access determination tree, since Subject-Type is UserID and Subject is Alice, the access determining means 13 follows the left link of the access determination tree. Next, the first path, "path1," of Object is "site," and this also corresponds to the link. The second path, "path2," is "people," and this corresponds to the left link. Then, since this node is the end node already, the determination of "access permitted" is made which is the access determination set to the end node. If the path the access to which is attempted by Alice is "/site/secret/blacklist," since "access denied" is set to the node under "/site/secret," the determination of "access denied" is made.

Next, a description will be given of the determination in the case where Object includes "//." Also in this case, as in the case where Object is composed including "/" only, the determination is settled by selecting an access determination tree and following the links thereof.

Figure 14:
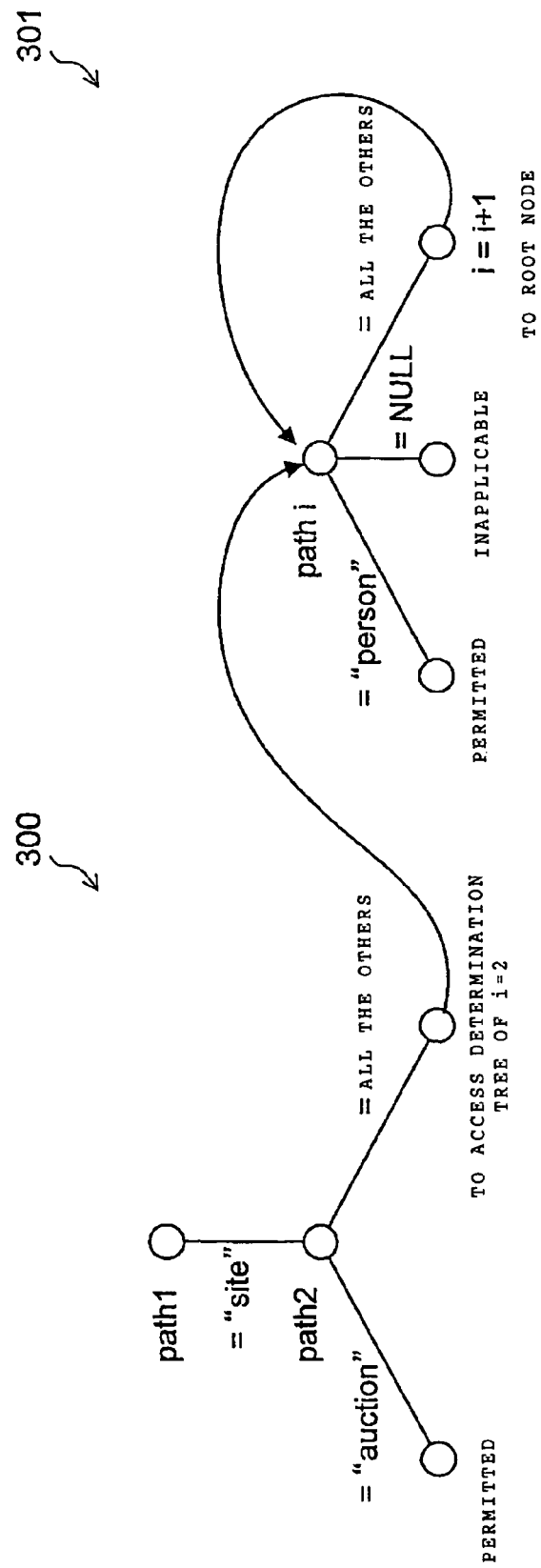
FIG. 14 illustrates access determination when "//" is included in Object.

For example, imagine the access control policy represented by the expressions (12) and (13). FIG. 14 shows access determination trees 300 and 301 of Object which are generated for these rules. Assume that Alice accesses "/site/people/person/name/." The Object elements of the access request elements are represented by a path value as shown in the expression (13).

<Alice, /site//person, +R> (12)

<Alice, /site/auction, +R>                            (13)

Path1: site

Path2: people

Path3: person

Path4: name                                           (14)

The access determining means 13 reaches the node of path1 via the node of "Subject: Alice." Next, the access determining means 13 follows the link which shows an agreement in the path value, "site." Then, from path2, the link of "all the others" is followed, and the access determination tree 301 is linked. Since i=2, the access determining means 13 checks path2, and follows the link of "all the others" of the access determination tree 301. Then, after i is added by 1, the access determining means 13 goes back to the root node of the access determination tree 301 again. This time, since i=3, the access determining means 13 checks path3. Since there exists a link corresponding to "person," this link is followed, and the determination result of "access permitted" is obtained.

A description will be given of the access control using a data value in the above described Step S81. As described above, when there is no predicate expression, the access determining means 13 performs the access determination without performing processing relating to a predicate expression. On the other hand, when there is a predicate expression, the access determining means 13 instructs the access-determination-tree generating means 12 to generate an access determination tree which determines the condition by the use of a data value (hereinafter referred to as "access determination tree using a data value"), and performs the access determination by the use of the generated "access determination tree using a data value." If the access determination tree using a data value has already been generated and stored in the access-determination-tree storing means 17, the access-determination-tree generating means 12 does not generate an access determination tree, and the access determining means 13 performs the access determination from the stored access determination tree.

A description will be given of the generation of an access determination tree when a predicate expression is included. The expressions (15) to (20) are the expressions in which predicate expressions only are shown out of each rule. These expressions mean that, when the conditions on the right side of the expressions are satisfied, +R (permitted) or −R (denied) which is written on the left side of the expressions is applied. As shown in the expression (17), in some cases, the predicate expression is composed with "[" doubled. In the case of the expression (17), since the conditions are ORed by OR, the expression (17) can be separated into the expressions (15) and (18). Also in the case where a predicate expression is not such an expression that is apparently separable by OR as in the case of the expression (17), an expression can be separated by the use of a disjunctive normal form, for example.

+R: [@salary>10000 and @band=6]                       (15)

−R: [@salary>10000 and @band=7]                       (16)

+R: [[@salary>10000 and @band=6] or @sal-
        ary<2000]                                         (17)

+R: [@salary<2000]                                    (18)

+R: [@age>30]                                         (19)

+R: [@salary<2000 and [@band=6 or @range=3]]          (20)

Names of specific parts of the predicate expressions are defined bellow. First, a condition expression is each of expressions which are separated by AND of the predicate expression. For example, the condition expression of the expression (15) is each of the expressions of "@salary>10000" and "@band=6." Particularly, when a plurality of condition expressions exist in the field enclosed by "[" like in the case of [@salary>10000 and @band=6], the two condition expressions are considered as a plurality of condition expressions enclosed by "[." Additionally, a condition variable is the variable next to @. In this case, the condition variables are "salary" and "band." Moreover, a condition value is composed of a condition of the condition variable and a data value. In this example, the condition values are ">10000" and "=6."

Figure 15:
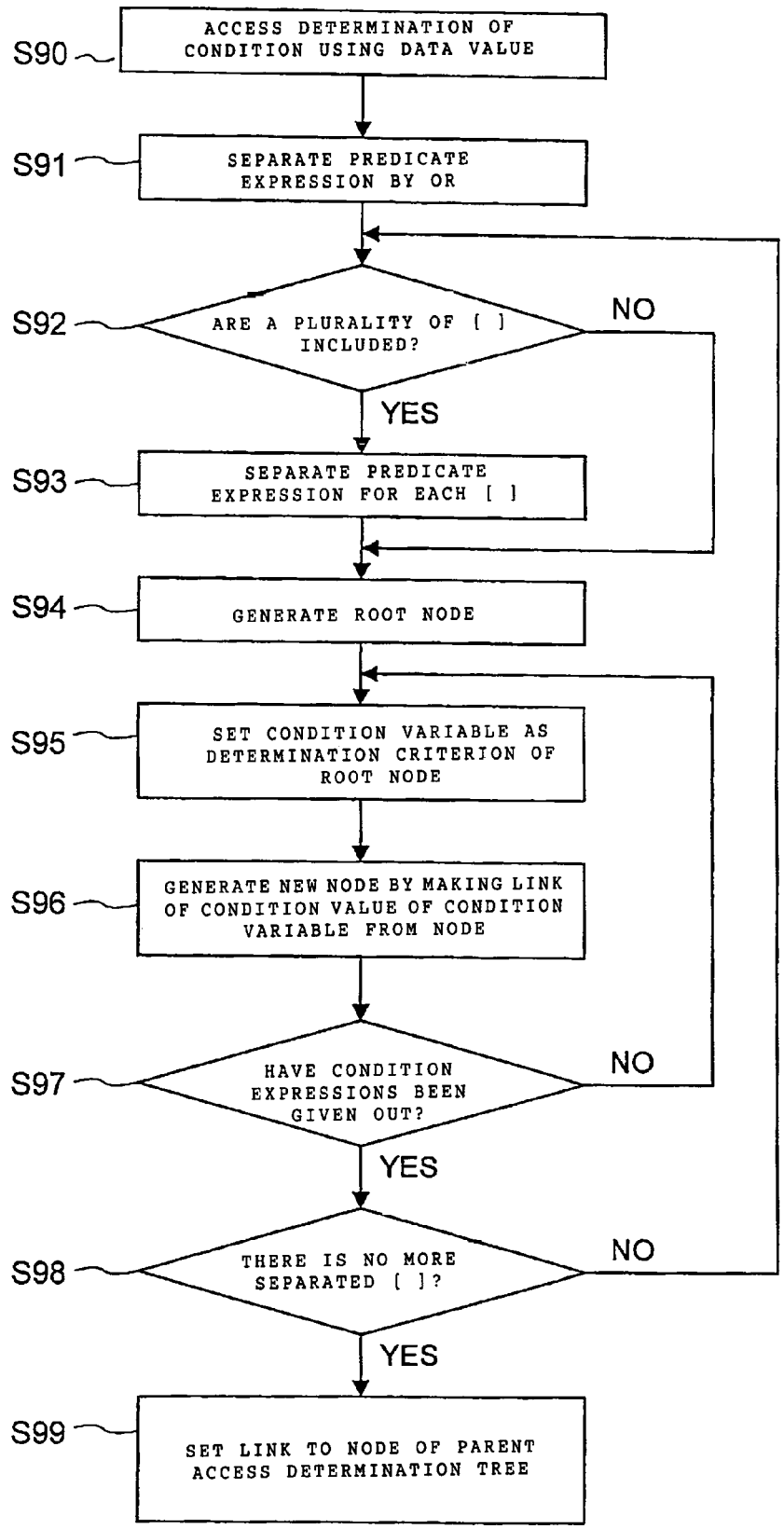
FIG. 15 is a flowchart showing a process performed when there is an access to a part the access to which is controlled by the use of a data value.

A flowchart of the access control using a data value is shown in FIG. 15. The access determining means 13 separates the predicate expression by OR (Step S91), and determines whether a plurality of "[" are included in the predicate expression (Step S92). The case where a plurality of "[" are included is the case of the expression (20), for example. In this case, the access-determination-tree generating means 12 generates access determination trees for the respective separated condition expressions (Step S98).

When there is one condition expression in the field enclosed by "[," Steps S95 to S97 are performed for the condition expression only. On the other hand, when there are a plurality of condition expressions in the field enclosed by "[," the access-determination-tree generating means 12 selects one condition expression, and generates an access determination tree for the condition expression. After this generation, the access-determination-tree generating means 12 selects the next condition expression, and generates an access determination tree therefor. In this manner, the access-determination-tree generating means 12 generates access determination trees for the plurality of condition expressions respectively (Step S97).

A description will be given of the generation of access determination trees for conditions enclosed by a pair of "[" and "]" more specifically. The access-determination-tree generating means 12 generates a root node (Step S94). Next, the access-determination-tree generating means 12 set the condition variable as the determination condition of the root node (Step S95), makes a link of the condition of the condition variable from the node, and generates a new node (Step S96). Moreover, if a condition expression follows after AND or OR, the access-determination-tree generating means 12 generates an access determination tree of the next condition expression (Step S97). If there is no more condition expression, the access-determination-tree generating means 12 set "access permitted" or "access denied" to the end node.

The access-determination-tree generating means 12 generates an access determination tree for the next "[" when the generation for one "[" is finished in the field enclosed by "[." The determination for this is performed in Step S98. When the generation of the access determination trees is finished for all of the condition expressions, a link is made between the root node of the access determination tree using a data value thus generated and the end node of the access determination tree not using a data value, the end node including the predicate expression (Step S99).

In some cases, two rules are set as an access control policy, like in the case of "the expression (15) AND the expression (19)." In this case, since each access determination tree is generated for each rule respectively, the process from Step S90 to Step S99 is repeated.

Figure 16:
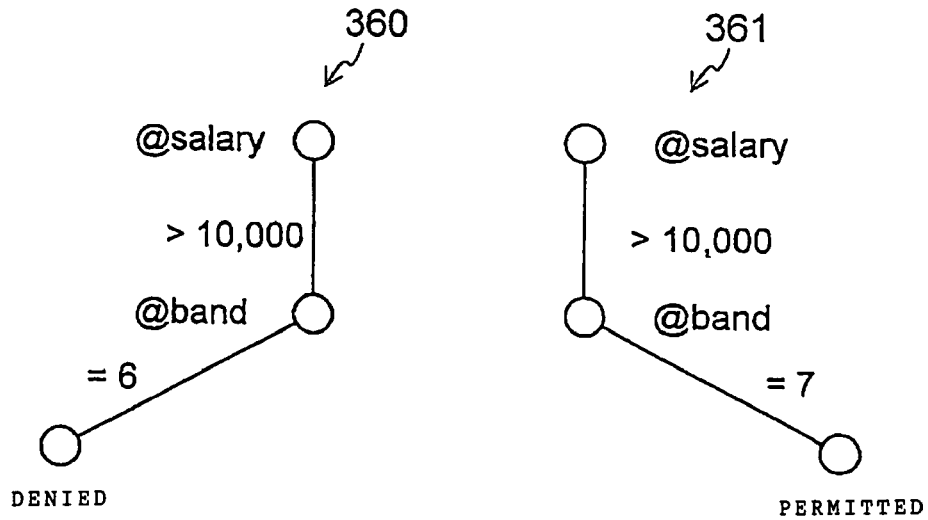
FIG. 16 shows the generation of access determination trees from conditions and the merging thereof.
Figure 16:
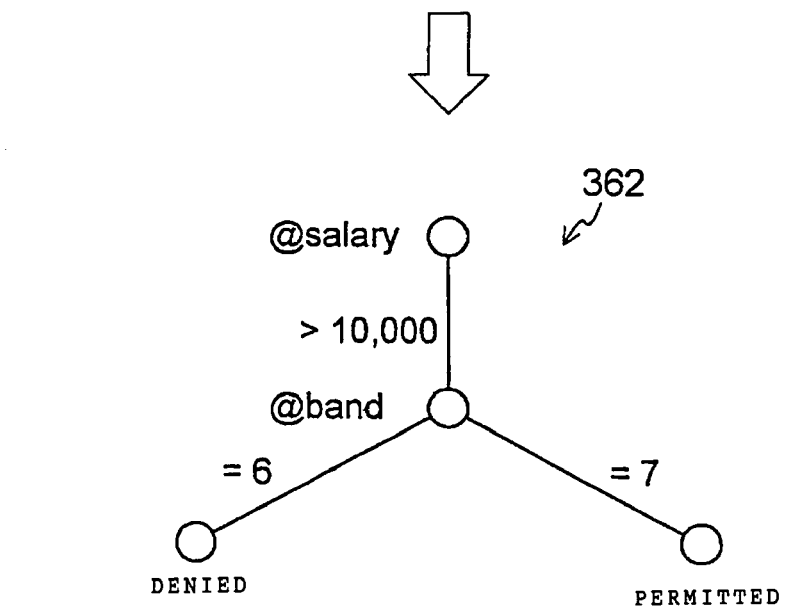

FIG. 16 shows an access determination tree 360 generated from the condition expression, @salary>10000, which is the first half of the expression (15), and the condition expression, @band=6, which is the latter half of the expression (15), and shows an access determination tree 361 generated from the condition expression, @salary>10000, which is the first half of the expression (16), and the condition expression, @band=7, which is the latter half of the expression (16). An access determination tree 362 below the arrow is generated by merging from the two access determination trees. In this case, since both of the access determination trees include the node and link designating the condition expression of the first half, @salary>10000, the access-determination-tree merging means 14 merges the upper nodes. By performing such merging, the data amount of the upper nodes of an access determination tree decreases, and therefore, it is possible to decrease the data amount of the access control policy.

Figure 17:
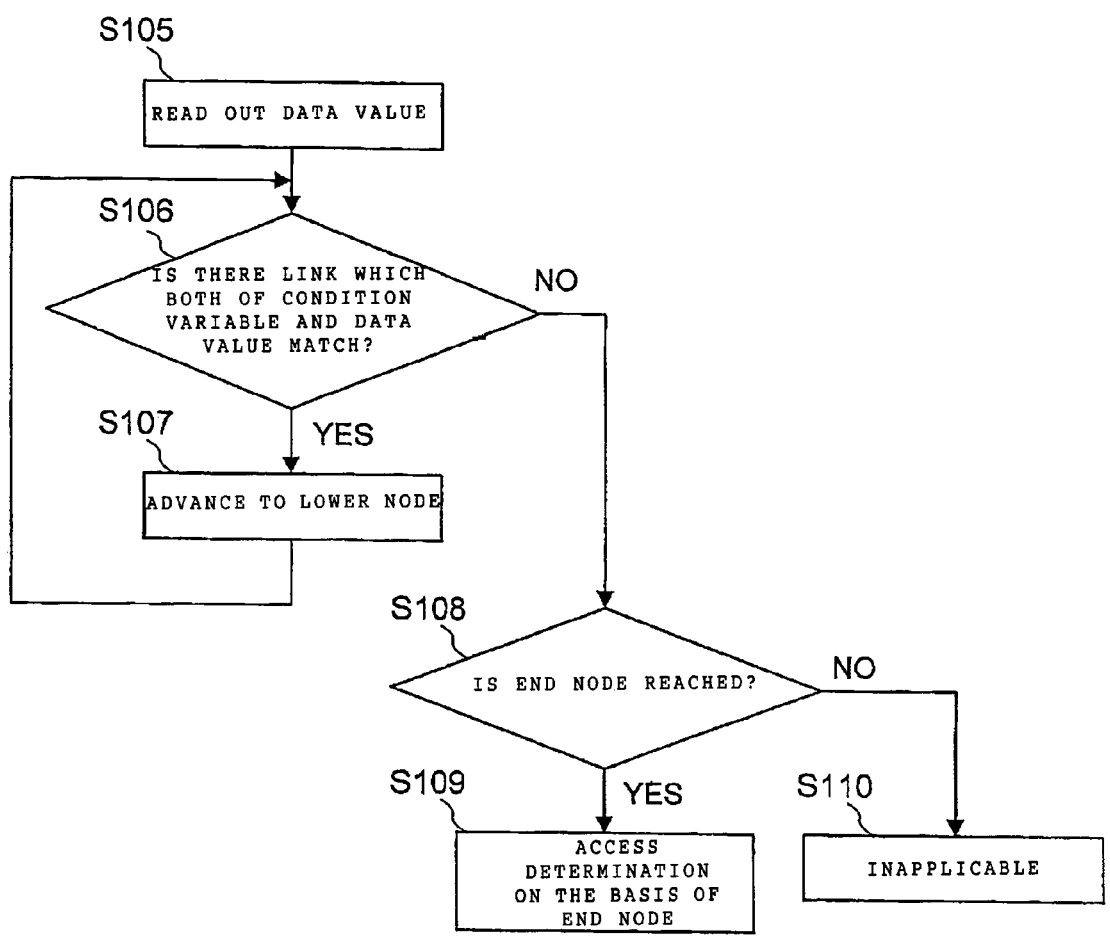
FIG. 17 is a flowchart showing a process of access determining means performed in the case where a data value is read out.

In the case of the access determination tree which includes a predicate expression, the access determining means 13 reads out the data values for the predicate expression from the data source. A process of reading out the data value is illustrated in a flowchart of FIG. 17. First, the access determining means 13 reads out a data value from the data source (Step S105).

By the use of the read-out data value and a condition variable, the access determining means 13 determines whether there exists a link corresponding to this data value (Step S106). If it is determined that the link exists, the access determining means 13 advances to a further lower node (Step S107), and determines whether there exists such a link. If there is no such link, the access determining means 13 determines whether the end node of the access determination tree is reached (Step S108). If it is not the end node, there is no node corresponding to the condition expression. Therefore, the access determining means 13 determines that this access determination tree is not applicable (Step S110). If it is the end node, the access determining means 13 performs the determination whether or not access should be permitted from Access-mode which is set to the end node (Step S109).

Figure 18:
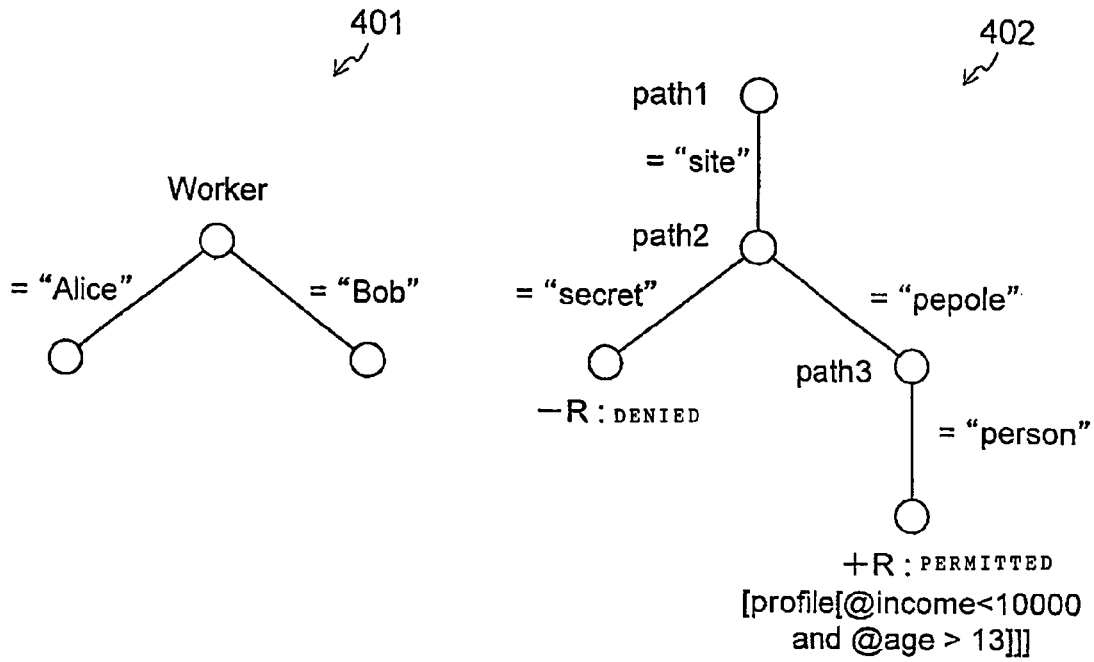
FIG. 18 shows access determination tree generated from access determination trees not using a data value and an access determination tree using a data value, and an XML document used.
Figure 18:
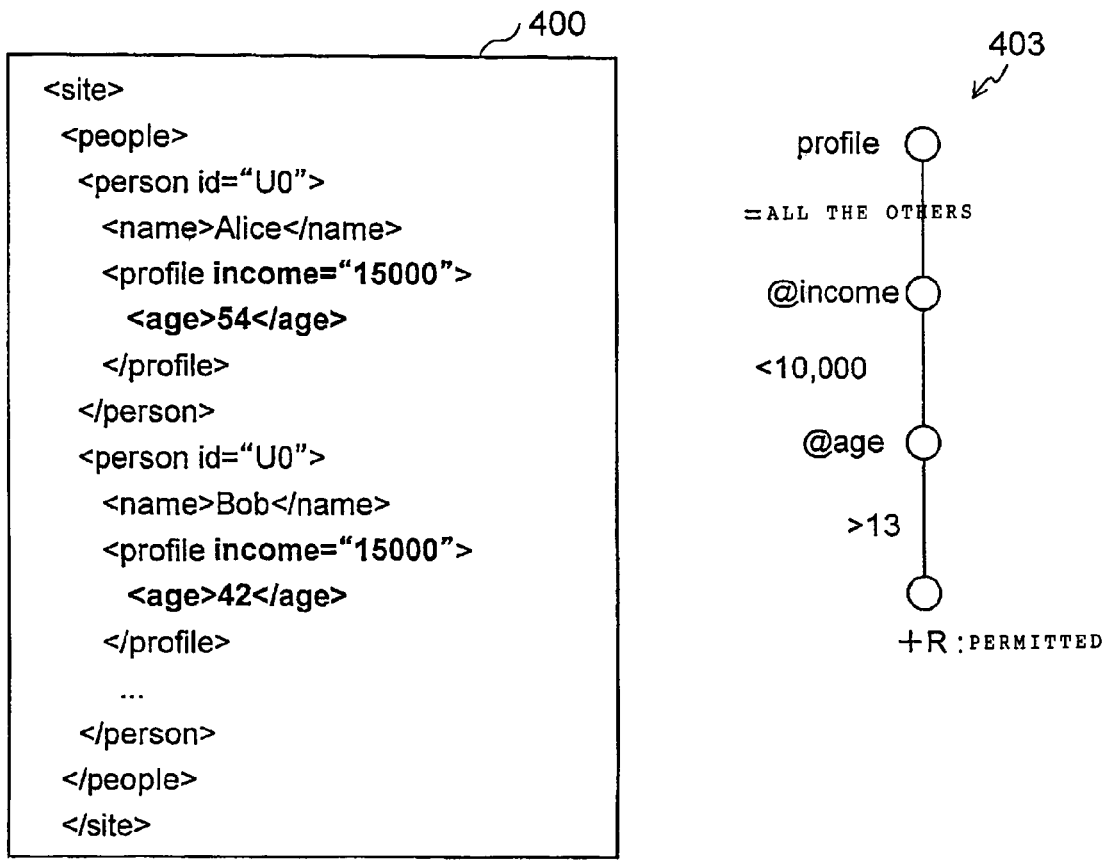

As a advantageous example in the case where a predicate expression exists, assume that the access determining means 13 reads out a data value from an XML document 400 of FIG. 18. Since the predicate expressions include @income and @age as condition variables, the access determining means 13 reads out the data values of @income and @age from the data source. The access control policy is the policy made up of the expressions (21) and (22). In this policy, a case will be discussed where Subject-Type is Group. Here, Alice and Bob belong to a group of Worker, an access determination tree 401 is generated as the access determination tree for Subject-Type and Subject. Moreover, an access determination tree 402 is generated from the Object part of the expressions (21) and (22).

<Group: Worker, /site/people/person[profile[@age>13 and @income<10000]], +R> (21)

<Group: Worker, /site/secret, -R> (22)

Such access determination trees 401 and 402 are access determination trees which do not need to read out a data value, and the determination whether or not access should be permitted is made normally by the use of these access determination trees. However, when there is a request of access to the part which is controlled by the use of a condition using a data value as described below, the determination whether or not access should be permitted is made by reading out a data value as described below.

Assume that the access control device 10 is requested to determine "whether one who belongs to the Worker group can access /site/people/person/name." The access determining means 13 follows the access determination trees 401 and 402, and follows the access determination tree 403 of Object.

By following the links, when the determination execution reaches the node to which a predicate expression is set, the access-determination-tree generating means 12 generates the access determination tree 403 using a data value. The access-determination-tree generating means 12 generates a root node, and assigns "profile" which is the first condition variable in the field enclosed by "[" to the attribute of the root node. Since the value of the condition variable "profile" may be any value, "all the others" is assigned as the value of the attribute for the node of profile. Next, the access-determination-tree generating means 12 generates the nodes and links for the condition expressions of "age>13" and "income<10000." Since these condition expressions are ANDed conditions by AND, as for the order of the nodes, the node of "income<10000" may be under the node of "age>13," and vice versa. In any of these cases, the access-determination-tree generating means 12 set Access-mode to the end node as the determination whether or not access should be permitted.

The access determining means 13 reads out a data value from the XML document 400 which is the data source. In this case, data values of income and age are described in the XML document 400 for each of Alice and Bob belonging to the Worker group. Accordingly, the access determining means 13 reads out the data values for both of Alice and Bob.

The read-out data values are represented as the expressions (23) and (24). From these expressions, the condition that age is higher than 13 is satisfied by either Alice or Bob. However, from the condition expression of income, the access of Alice will be denied because income is 15000, and the access of Bob will be permitted because income is 5000.

Alice @income:15000, @age:54 (23)

Bob @income:5000, @age:42 (24)

As described above, in the case of the access to the part of the data source which is designated by the expression (22) (the access to /site/secret by Alice), the access determining means 13 performs the determination whether or not access should be permitted by the use of the access determination trees 401 and 402. However, in the case of the access to the part which is designated by a predicate expression like in the case of the expression (17) (the access to /site/people/person by Alice), there arises the necessity to read out a data value for the determination whether or not access should be permitted. In this case, the access determination tree 403 is generated, and the determination whether or not the access to the part which is designated by the predicate expression should be permitted is made.

Accordingly, it is not necessary to always store tree-structured data which has a node of a condition using a data value in a storing device, such as a memory, as data for access determination.

It should be noted that the access determination trees 402 and 403 of Object can be used in any of the cases where Subject is Alice, Bob, or Worker. Specifically, the access determination trees 402 and 403 of Object can be used independently of the access determination tree of Subject. For example, the access determination trees 402 and 403 can be linked not only to the access determination tree 401 for Subject but also to the access determination tree 200 for Subject of FIG. 6. In this case, the access determination trees 200 and 401 can share the access determination trees 402 and 403.

Figure 19:
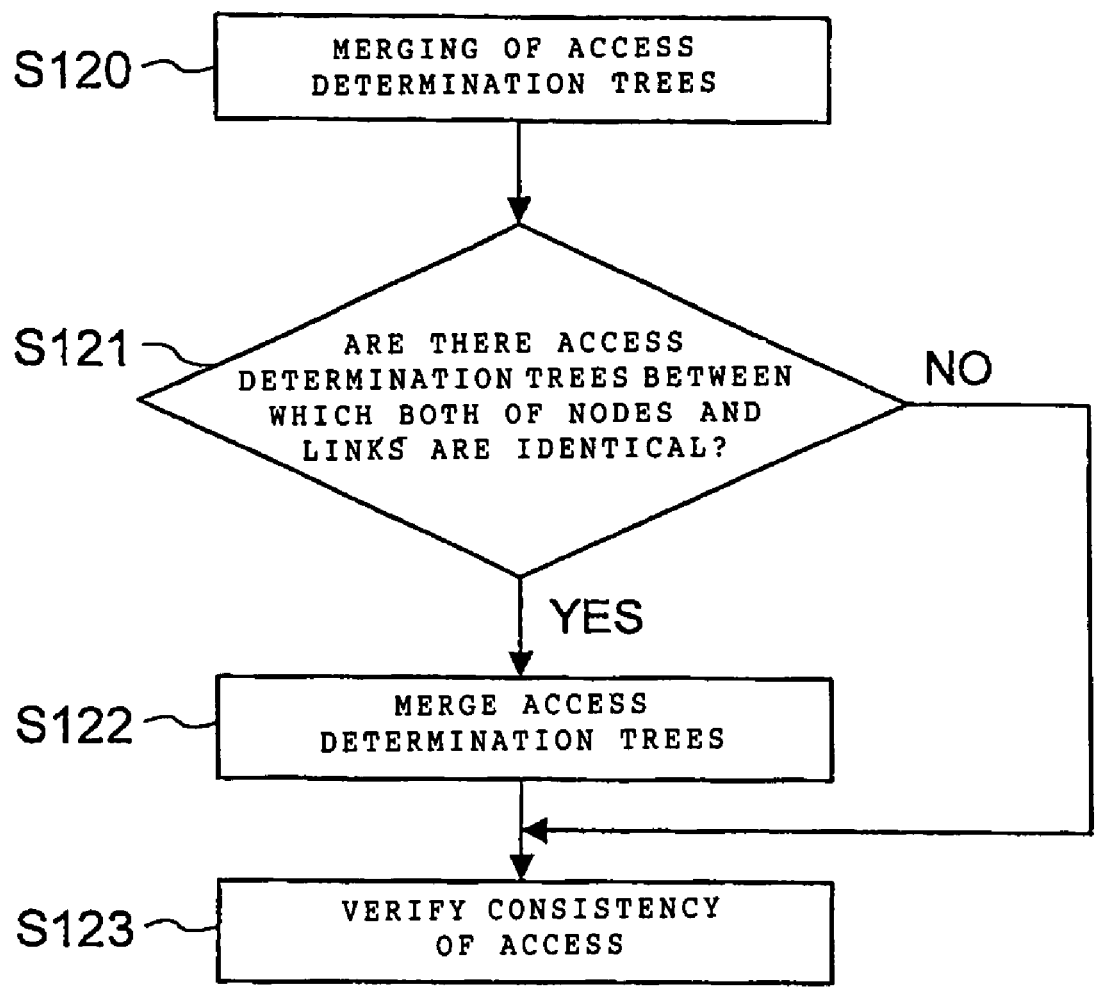
FIG. 19 is a flowchart showing a process procedure of merging access determination trees.

Additionally, the access-determination-tree generating means 12 may merge a plurality of access determination trees which include identical nodes and links, after the access determination tree using a data value and the access determination tree not using a data value are generated. A flowchart of merging access determination trees is shown in FIG. 19. The access-determination-tree generating means 12 determines whether certain links and nodes of an access determination tree are the same as those of another access determination tree (Step S121). When these are identical respectively, the access-determination-tree generating means 12 merges the access determination trees (Step S122). The consistency verification means 15 may verify the consistency of the access after the finish of generation and merging of the access determination trees (Step S123).

Additionally, after an access generation tree using a data value is generated, the access determination tree may be linked to the access determination tree not using a data value which is to be the upper node.

An access control method which realizes such an embodiment can be realized by a program to be executed on a computer or a server. As the storing medium for this program, an optical storage medium such as a DVD, an MO and a PD, a tape medium, a semiconductor memory or the like can be listed. Additionally, a storing device such as a hard disk or a RAM which is provided in a server system connected a private communication network and/or the Internet may be used as storing means to provide the program via the network.

Hereinbefore, while the embodiment of the present invention has been described, this is only for the purpose of illustrating a specific example, not limiting the present invention. Moreover, the effects described in the embodiment of the present invention are listed only as the most advantageous effects obtained from the present invention. The effects of the present invention are not limited to those described in the embodiment of the present invention.

According to the above described embodiment, an access control device, an access control method, and a computer readable storage medium storing the method, which are recited in the below described items, can be realized.

(1) An access control device for controlling access to a data source, comprising:
  policy storing means for storing a plurality of policies, each for controlling access to a part of the data source, when these policies are inputted;
  access-determination-tree generating means for generating a plurality of tree-structured data from the plurality of policies;
  access-determination-tree merging means for merging the plurality of tree-structured data;
  access-determination-tree storing means for storing the merged tree-structured data; and
  access determining means for, in response to access to a part of the data source being attempted, determining from the merged tree-structured data whether or not the access to the part should be permitted.

(2) The access control device as recited in the item (1), wherein
  the access-determination-tree merging means merges the plurality of tree-structured data by extracting a common part of the plurality of tree-structured data and placing the extracted common part on an upper node of the tree structure.

(3) The access control device as recited in the item (2), wherein
  the access-determination-tree merging means performs the merging so that the common part of the plurality of tree-structured data becomes maximum.

(4) The access control device as recited in the item (1), further comprising:
  consistency verification means for, after the determination whether or not the access should be permitted is made, verifying consistency of the determination.

(5) The access control device as recited in the item (1), wherein,
  the access determining means reads out a data value from the data source in response to the access to the part of the data source being attempted, and, by the use of the data value, determines whether or not the access should be permitted from the merged tree-structured data.

(6) The access control device as recited in the item (1), wherein
  the part of the data source is designated by a path expression described in a path expression language.

(7) The access control device as recited in the item (6), wherein
  the access-determination-tree generating means generates the tree-structured data from the path expression and an attribute of a user who attempts to access the part of the data source.

(8) The access control device as recited in the item (6), wherein
  the path expression language is XPath.

(9) An access control method for controlling access to a data source, comprising the steps of:
  storing a plurality of policies, each for controlling access to a part of the data source, when these policies are inputted;
  generating a plurality of tree-structured data from the plurality of policies;
  merging the plurality of tree-structured data;
  storing the merged tree-structured data; and
  in response to access to a part of the data source being attempted, determining from the merged tree-structured data whether or not the access to the part should be permitted.

(10) The access control method as recited in the item (9), wherein,
  in the merging step, the access control device merges the plurality of tree-structured data by extracting a common part of the plurality of tree-structured data and placing the extracted common part on an upper node of the tree structure.

(11) The access control method as recited in the item (10), wherein,
  in the merging step, the access control device performs the merging so that the common part of the plurality of tree-structured data becomes maximum.

(12) The access control method as recited in the item (9), further comprising the step of:
  after the determination whether or not the access should be permitted is made, verifying consistency of the determination.

(13) The access control method as recited in the item (9), wherein,
  in the tree-structured data generating step, the access control device generates the tree-structured data from a path expression designating the part of the data source and an attribute of a user who attempts to access the part of the data source.

(14) A computer-readable storage medium storing a program for executing the access control method as recited in any one of items (9) to (13).

The present invention is applicable not only to a database management system in which many users access a data source having a large amount of data, but also to a database management system in which a plurality of data sources having a large amount of data are stored in physically different servers and the like, and many users access these data sources.

Although the advantageous embodiment of the present invention has been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above.

The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An access control device for controlling access to a data source, comprising performing control means to control access when a user accesses data stored in a database server, the performing control means comprising:

policy storing means for storing a plurality of policies, each policy for controlling access to a part of said data source in said database server, when said plurality of policies are inputted;

access determination-tree generating means for generating a plurality of tree-structured data from said plurality of policies;

access-determination-tree merging means for merging said plurality of tree-structured data;

access-determination-tree storing means for storing the merged tree-structured data in said database server and reducing an amount of data stored in a portion of said database constituting policies; and access determining means for, in response to said access to said part of said data source being attempted, determining from said merged tree-structured data whether or not said access to said part of said data source should be permitted, and wherein said access-determination-tree merging means merges said plurality of tree-structured data by extracting a common part of said plurality of tree-structured data and placing the extracted common part on an upper node of the tree structure, and said access-determination-tree merging means performs the merging increasing said common part of said plurality of tree-structured data, and further comprising consistency verification means for, after the determination whether or not said access should be permitted is made, verifying consistency of said determination, and wherein:

said access determining means reads out a data value from said data source in response to said access to said part of said data source being attempted, and, by the use of said data value, determines whether or not said access should be permitted from said merged tree-structured data;

said part of said data source is designated by a path expression described in a path expression language;

said access-determination-tree generating means generates said plurality of tree structured data from said path expression and an attribute of a user who attempts to access said part of said data source; and said path expression language is XPath.

* * * * *